United States Patent [19]

Duggan et al.

[11] Patent Number: 6,002,871
[45] Date of Patent: Dec. 14, 1999

[54] MULTI-USER APPLICATION PROGRAM TESTING TOOL

[75] Inventors: Joseph C. Duggan, Glenside; Kristine Sedlak, East Norriton; Matthias Thul, Audubon; Julie Karcis, Paoli; Richard James Lantz, Harleysville, all of Pa.

[73] Assignee: Unisys Corporation, Blue Bell, Pa.

[21] Appl. No.: 08/958,061

[22] Filed: Oct. 27, 1997

[51] Int. Cl.$^6$ .................................................. G06F 9/45
[52] U.S. Cl. ............................................ 395/704; 714/38
[58] Field of Search ..................................... 395/704, 500, 395/183.08; 707/513

[56] References Cited

U.S. PATENT DOCUMENTS

| | | | |
|---|---|---|---|
| 5,257,373 | 10/1993 | Kurihara et al. | 395/704 |
| 5,297,274 | 3/1994 | Jackson | 395/704 |
| 5,475,843 | 12/1995 | Halviatti et al. | 395/704 |
| 5,495,571 | 2/1996 | Corrie, Jr. et al. | 395/704 |
| 5,640,537 | 6/1997 | Jessen et al. | 395/500.44 |
| 5,669,000 | 9/1997 | Jessen et al. | 395/704 |
| 5,708,774 | 1/1998 | Boden | 714/38 |
| 5,715,387 | 2/1998 | Barnstijn | 714/38 |
| 5,745,767 | 4/1998 | Rosen et al. | 395/704 |
| 5,774,725 | 6/1998 | Yadav et al. | 395/704 |
| 5,799,142 | 8/1998 | Toyoda | 714/38 |
| 5,805,892 | 9/1998 | Nakajima | 395/704 |
| 5,819,093 | 10/1998 | Davidson et al. | 395/704 |
| 5,881,219 | 3/1999 | Leung et al. | 714/31 |
| 5,933,639 | 8/1999 | Meier et al. | 395/704 |
| 5,940,593 | 8/1999 | House et al. | 395/704 |

OTHER PUBLICATIONS

Lowell Jay Arthur and Ted Burns, UNIX Shell Programming: Third Edition, 8, 11, 120, 129, 155, 158, 1994.

W. Richard Stevens, UNIX Network Programming, 197–257, 1990.

Kaare Christian, The UNIX Operating System, 89–90, 165, 1983.

Microsoft Corporation, Programmer's Guide to Microsoft Windows 95: Key Topics on Programming for Windows from the Microsoft Windows Development Team, 130, 1995.

Comnet III Product Description [retrieved on Aug. 5, 1999]. Retrieved from the Internet <URL: http://www.caciasl.com/COMNET_quick_look.html >, Jan. 1995.

Ji Shen and S. Butler, Performance Modeling Study of a Client/Server System Architecture, Proceedings of the 1994 Conference on Winter Simulation, 1280–87, Dec. 1994.

(List continued on next page.)

*Primary Examiner*—Tariq R. Hafiz
*Assistant Examiner*—Michael J Pender, Jr.
*Attorney, Agent, or Firm*—Steven B. Samuels; Mark T. Starr; Rocco L. Adornato

[57] ABSTRACT

A test tool for testing application programs of the type that are deployed on a server computer for access by multiple users over a network is embodied in a computer program comprising a command module and a core module. The command module contains a number of different commands, each of which performs a different user function of the application program under test. Each of the commands comprises a series of programmed instructions that cause a computer running the test tool to perform a user function of the application program under test via a client connection to the application. Each command has an execution segment and a verification segment. Each command is also assigned a unique name. A test operator can then create test scripts containing any desired sequence of command module commands using the simple names assigned to each command. The command module is rewritten and/or customized for each different application program to be tested. The core module is independent of the command module and performs the core functionality of the test tool. The core module comprises instructions that enable the computer on which the test tool is running to execute concurrently, on each of a plurality of different client connections to the application program under test, a series of command module commands specified by name in a test script.

38 Claims, 15 Drawing Sheets

OTHER PUBLICATIONS

Marc Abrams et al., Multimedia Traffic Analysis Using CHITRA95, Proceedings of the Third International Conference on Multimedia '95, 267–76, Nov. 1995.

Michael B. Jones et al., CPU Reservations and Time Constraints: Efficient, Predictable Scheduling of Independent Activities, Proceedings of the sixteenth ACM Symposium on Operating Systems Principles, 198–211, Oct. 1997.

Time Options

☑ Start  10/13/97  14:00:00

☑ Stop  10/14/97  15:30:00

OK  Clear  Cancel

MULTI-USER APPLICATION PROGRAM TESTING TOOL

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

BACKGROUND

1. Field of the Invention

The present invention relates to testing of computer programs or applications, and more particularly, to a tool for testing application programs of the type that are deployed on a server computer for access by multiple users over a network, such as, for example, World Wide Web applications accessible via the Internet or an intranet.

1. Description of the Prior Art

Developers of application programs that are to be deployed on a network server for concurrent access by Multiple users, such as client/server applications and web-based Internet or intranet applications, need to be able to test the ability of these application programs to operate under significant user loads. For example, a web-based application that is accessible by multiple users, or clients, via the Internet, can become overwhelmed when a large number of clients attempt to access that application concurrently. Prior to deployment, it is desirable to test an application's ability to handle multiple users to make sure that the application will operate correctly and provide acceptable response times under expected user loads.

Subjecting an application program to access by multiple clients to ensure that the application operates properly and provides acceptable response times under such loads is generally referred to as load or stress testing. Stress testing a client/server or web-based application prior to deployment is becoming increasingly important as the number of users of the Internet, and thus the likelihood of heavy user loads, increases. In the past, load testing has been done with real people who concurrently access and test an application manually, noting any errors that are encountered under such conditions. Use of real people to perform stress testing is simply not feasible today, as most web-based applications can expect typical concurrent access by hundreds of users.

Automated testing of single-user application programs is known. U.S. Pat. No. 5,475,843, assigned to Borland International, Inc., for example, describes an automated test tool for testing the graphical user interface features of Microsoft® Windows® application programs. Test scenarios are built around Generic Element Models (GEM) that are stored in a library. Each GEM represents the behavior of a basic Microsoft® Windows® graphical user interface element, such as a push button, a check box, a list box, or the like. Thus, the Borland tool is Windows® specific. U.S. Pat. Nos. 5,669,000 and 5,640,537, both assigned to Apple Computer, Inc., describe automated testing techniques for testing the graphical user interface features of single-user Macintosh® application programs. None of these programs, however, provides the ability to simulate concurrent, multi-user access to a multi-user application program such as a client/server or web-based application program deployed on the Internet or an intranet. Accordingly, these tools are not useful for testing such applications.

Recently, a few vendors have advertised tools that purport to perform stress testing of web applications by simulating multiple user loads on a web site. One such tool, called WebLoad, has been advertised by RadView Software, Ltd. The WebLoad tool can establish multiple connections to a web application and can run "user-defined" test scripts on each connection to simulate user interaction with the web application on those connections. However, the user-defined scripts must be written in a specific programming language, requiring knowledge of that language to generate test scripts. Alternatively, a test script can be generated "automatically" by recording the interaction between a real user and the web application. This offers less flexibility, because the test scripts are dictated by the sequence of recorded events.

Another recently advertised stress testing tool, called Web Hammer, advertised by Hammer Technologies, 226 Lowell Street, Wilmington, Mass. USA 01887, suffers from the same deficiencies as the WebLoad tool, in that test scripts that test the functionality of a web application are written in a complicated programming language. Writing test scripts therefore requires knowledge of the programming language, and modification of scripts requires reprogramming and is time-consuming.

Rational Software Corporation presently advertises two stress testing products, Performix and preVue. However, the only advertised means of creating test scripts in these products is by recording real user interaction with the web application under test. This limits flexibility and makes editing of scripts difficult.

As the foregoing illustrates, none of these products provides a simple, easy way to generate and/or modify a number of different test scripts in a manner that requires little programming expertise. Moreover, while each of these products purports to provide the ability to execute the user interface functions of a web application under test, there is no indication that these products can verify proper execution of these functions, other than by recording errors that might be returned by the web application itself Accordingly, there is a need for a tool for testing multi-user application programs, such as web applications, that enables easy creation and editing of test scripts and that provides enhanced verification of proper execution of the user functions of the application program under test. The present invention satisfies these needs.

SUMMARY OF THE INVENTION

The present invention is directed to an application program test tool for testing application programs of the type that are deployed on a server computer for access by multiple users over a network, such as, for example, client/server applications and applications deployed on the World Wide Web of the Internet ("web applications") or on an intranet. The application program test tool of the present invention can be used for both stress testing and regression testing of such application programs.

According to a preferred embodiment, the test tool of the present invention comprises a computer program, embodied on a computer-readable medium, that runs on a single computer (hereinafter "the test tool program"). The test tool program comprises a command module and a core module. The command module is customized for each application program to be tested, and the core module serves as the main test engine. The command module contains a number of different commands, each of which performs a different user function of the application program under test. Each of the commands comprises a series of programmed instructions that cause the computer on which the test tool is running to perform a user function of the application program under test via a client connection to the application. Each command is assigned a unique name. A test operator can then create test scripts containing any desired sequence of command module commands using the simple names assigned to each command. The commands specified by name in a test script are executed sequentially by the test tool. No knowledge of the underlying programmed instructions of the command module is needed by a test operator, and the test scripts can be easily modified by adding or deleting command names from the script or by changing the order of command names in the script. Thus, programming expertise is only needed once—at the time the command module is programmed. The command module is rewritten and/or customized for each different application program to be tested.

The core module of the program is independent of the command module; it performs the core functionality of the test tool and does not have to be rewritten for different application programs to be tested. In accordance with the present invention, the core module comprises instructions that cause the single computer on which the test tool program is running to execute concurrently, on each of a plurality of different client connections to the application program under test, a series of command module commands specified by name in a test script. A test script can comprise any desired combination of command names, in any desired order.

With the foregoing program structure, different command modules can be created for different application programs to be tested. Once a command module is created, a test operator can create any number of different test scripts to test the various functions of the application program under test. Test scripts can easily and quickly be generated using the simple names assigned to each command of the command module. This hides the complexity of the command functionality from the test operator, and provides the operator with complete control over the sequence and length of the test to be performed. Test operators do not need to have any programming expertise—only knowledge of the different user functions that each command represents. Thus, the present invention provides a simple, easy-to-use, yet powerful tool for testing multi-user application programs such as client/server and web-based applications.

Another important feature of the present invention is that it provides enhanced verification of proper execution of the user functions of the application program under test. According to the present invention, each command of the command module comprises an execution segment and a verification segment. The execution segment contains instructions for performing a particular user function of the application program under test, and the verification segment contains instructions for verifying, at the computer running the test tool program, whether that user function was performed correctly by the application program. More specifically, the verification segment of each command parses a user interface object associated with the user function to test whether expected elements of the user interface object appear in response to execution of that user function. This enhanced level of command verification ensures that all errors are logged, and does not rely upon the error notification features of the application program itself.

Additional features of the test tool program include a graphical user interface through which a test operator can easily modify test parameters, including, for example, the rate at which test script execution is initiated on successive client connections, the total number of test scripts executing concurrently on different client connections, and the duration of a given test run. The duration of a test run can be defined either as a total number of test scripts to be executed over all client connections, or as a specified period of time.

Other features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 8 shows a Time Options dialog box of the user interface of the application program test tool of the present invention, which is used to specify the duration of a test in terms of a start time and a stop time;

DETAILED DESCRIPTION OF THE PREFERRED EMBODIMENT

Figure 1:
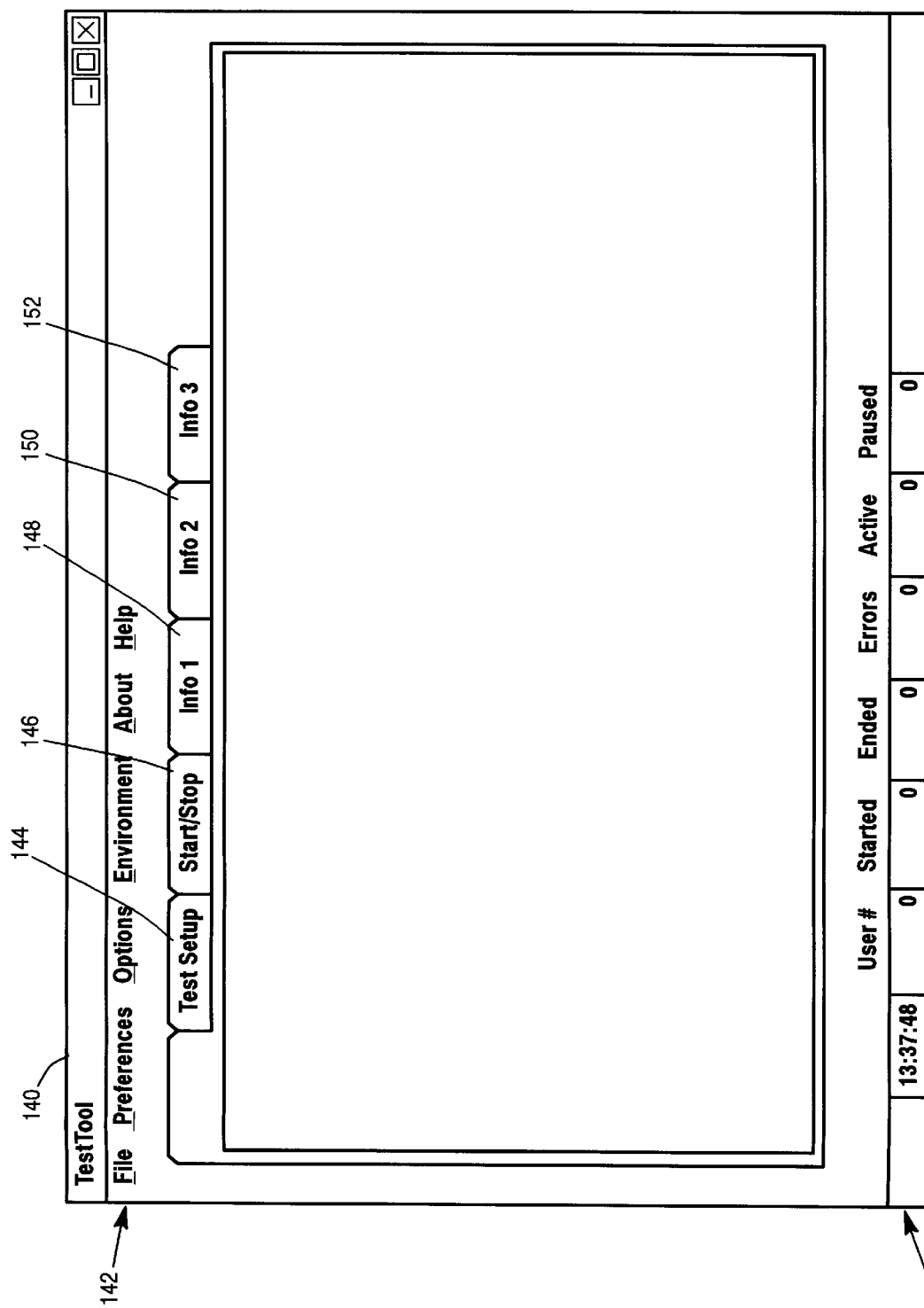
FIG. 1 shows a main window of the graphical user interface of the application program test tool of the present invention, illustrating an arrangement of tabs of the user interface in accordance with the preferred embodiment.

The present invention is directed to a test tool for testing application programs of the type that are deployed on a server computer and that are intended to be accessed concurrently by multiple users over a network, such as the Internet or an intranet. Application programs of this type include, for example, client/server applications, applications deployed on the World Wide Web of the Internet ("web applications"), and similar applications deployed on an intranet.

According to a preferred embodiment, the test tool of the present invention comprises a computer program, embodied on a computer-readable medium, that runs on a single computer (hereinafter "the test tool program"). The test tool program may take the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The test tool program may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique device that operates analogously to specific logic circuits.

I. Definitions

As used herein and in the claims, the following words and phrases have the following meanings.

A "client connection" is a resource, allocated by the test tool program, through which access to an application program under test is made. In the present embodiment, each client connection comprises a Microsoft® Windows® socket. A client connection may or may not be continuous, depending upon the type of server-based application program being tested. For example, in accordance with the HTTP protocol, which governs communication between a client (e.g., a web browser) and a web application deployed on a server computer (e.g., a web site) attached to the Internet, the connection between the client and the web application is opened and closed for each HTTP request/response operation; this form of connection is non-continuous. As used herein and in the claims, the term client connection encompasses both continuous and non-continuous types of connections to an application program.

A "command" is a series of program instructions which, when executed, cause the computer running the test tool program to perform a user function of the web application under test via a client connection. In accordance with the present invention, each command is assigned a unique "command name."

A "test script" is a text file containing a list of the names of a set of commands to be executed by the test tool program during a test run.

A "session" refers to the execution of one test script, on one client connection, one time. In accordance with the present invention, the test tool program executes multiple, concurrent sessions, each session representing one virtual user of the application program.

"Concurrency" is a test parameter that specifies the maximum number of allowed concurrent sessions.

"Rate" is a test parameter that specifies the rate at which the test tool program is permitted to initiate new sessions on successive client connections up to the allowed concurrency. In the present embodiment, rate is expressed in units of seconds.

A "test run" is one complete test of an application program from beginning to end. "Duration" refers to the length of a test run, and, in the present embodiment, can be expressed as either a total number of completed sessions across all client connections, or a fixed length of time specified in terms of a start time and a stop time.

An "environment" is a group of parameters relevant to a test run, including, for example, a port number and network address (e.g., IP address) of the server computer on which a web application under test is deployed, and a directory path on the computer running the test tool in which log files are to be saved.

A "scenario" defines parameters associated with a particular test run, including the name of a user list, a test script, and values for rate, duration, and concurrency. These parameters can be saved in a file referred to herein as a scenario file.

A "user," sometimes also referred to as a "client," is a person who accesses and interacts with an application program via a network connection. Each session on a given client connection represents one "virtual" user interacting with the application program over the client connection. Each virtual user may have a username and a password required to access an application program.

A "user list" is a text file containing a list of names and passwords representing virtual users of an application program under test. A user list is needed for those application programs that require a username and password to gain access to the application.

A "client program" is a program that a user employs to access and interact with an application program deployed on a server computer. Examples of client programs include Microsoft® Internet Explorer and Netscape Navigator™, which are client programs (commonly referred to a web browsers) used to access web applications.

II. The Test Tool Program

In accordance with the present embodiment, the test tool program of the present invention is capable of executing test scripts of from 1 to 50 commands, at a concurrency of from 1 to 300, based on a user list containing from 1 to 10,000 different user entries. A test run can have a duration specified in terms of either 1 to 9,999,999 completed sessions, or a length of time defined by a start time and a stop time. In other embodiments, these limits may be higher or lower.

A. The Test Tool Program User Interface

Referring to the drawings wherein like numerals indicate like elements throughout, FIG. 1 shows a main window 140 of the user interface of a preferred embodiment of the test tool program of the present invention. The main window 140 presents five tabs that a test operator may select to operate the program, a Test Setup tab 144, a Start/Stop tab 146, an Info1 tab 148, an Info2 tab 150, and an Info3 tab 152.

Figure 2:
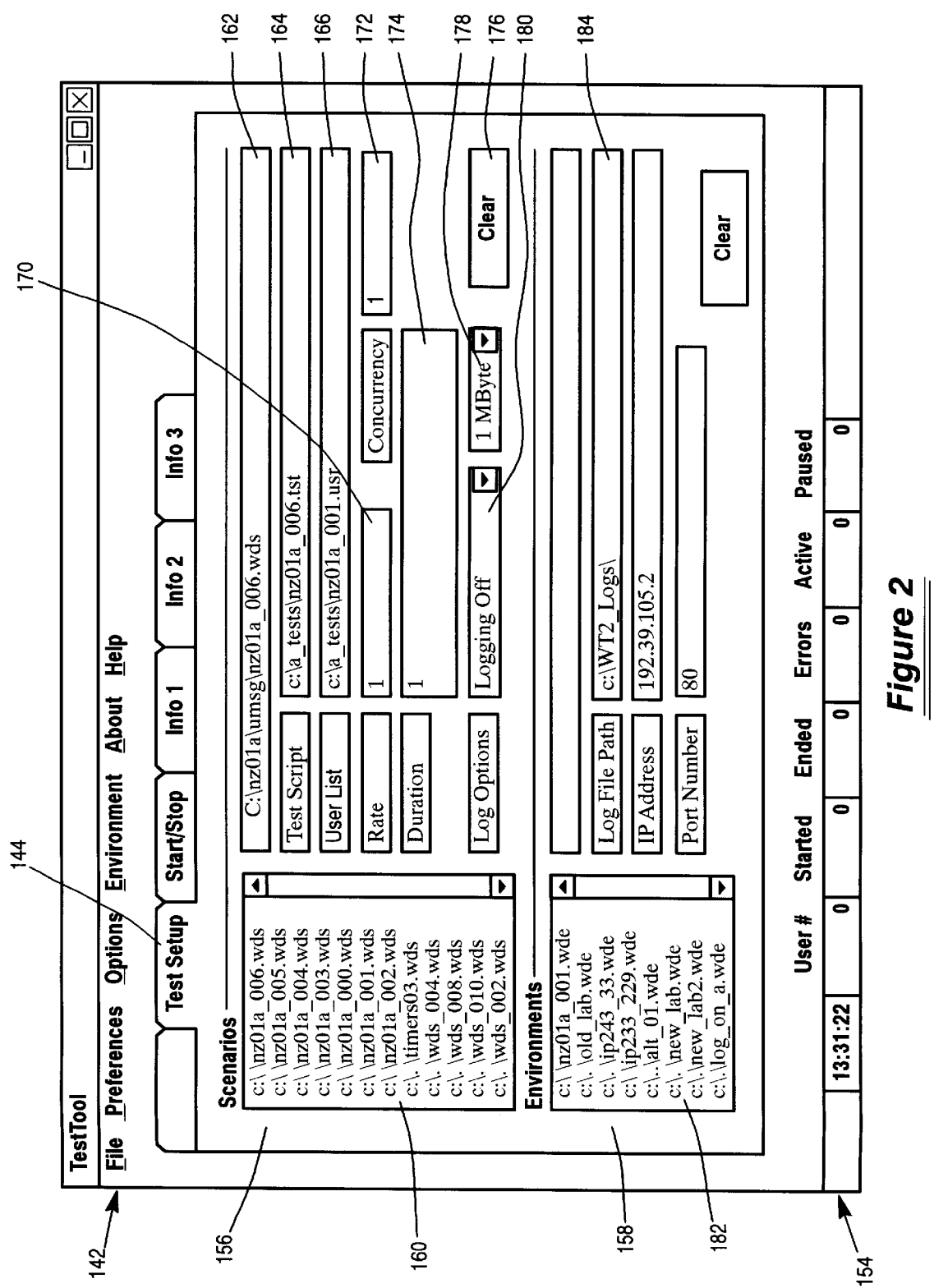
FIG. 2 shows a Test Setup tab of the user interface of the application program test tool of the present invention.

FIG. 2 shows the content and arrangement of the Test Setup tab 144. A valid test consists of a valid scenario and a valid environment. A top portion 156 of the Test Setup tab 144 is for setting a scenario, and a bottom portion 158 is for setting an environment. A scenario consists of a valid test script (a file having a ".tst" extension), a valid user list (a file having a ".usr" extension), values for the three parameters, rate, concurrency and duration, and a selected option for logging information during a test run. A scenario can be saved as a file on the computer running the test tool program. A saved scenario file can be retrieved by either selecting (i.e., double-clicking) any of a number of different saved scenarios displayed in a window 160 of the Test Setup tab 144. A list of the last N scenario file names are stored in a .INI file associated with the test tool program, and it is these N file names that are displayed in the scenario file window 160. A scenario file can alternatively be selected using the File drop down menu in the menu bar 142, which provides a standard dialog box for opening files. A field 162 of the Test Setup tab 144 specifies the directory path and file name of the selected scenario file. Scenario files have a ".wds" extension. An exemplary scenario file has the following contents:

```
[files]
tst=c:\a_tests\test7.tst
usr=c:\a_tests\usrlst01.usr

[run]
rate=8
concur=30
durat=1000
logopt=event
logsize=2
```

Test scripts are ASCII text files containing a list of the names of commands to be executed. Each line of the file contains one command name, and the commands are executed in the order listed. Examples of typical commands include LOGON, PASSWORD, GET_ALL, READ_EM, READ_FAX, READ_VOC, WAIT_SSS, WAIT_SSS_RRR, and LOGOFF. Preferably, all commands are in uppercase type. A test script may have a header starting with the word TEST, as well as lines of comments denoted with exclamation points ("!").

For application programs that require a user name and password in order to "logon" to the application, the test tool program supports user lists containing from 1 to 10,000 username/password combinations. A user list file is an ascii text file, each line of which contains one username/password combination. User list files have a header starting with the word USER and containing any number of comment lines denoted with exclamation points ("!").

The File drop down menu in the menu bar 142 can be used to access test script and user list files, as is the case for scenario and environment files. When the File menu is accessed, a standard file selection dialog box appears. Any file can be selected from the file selection dialog box by, for example, double-clicking on the file name. Fields 164 and 166 specify the directory paths and file names of the test script and user list files, respectively, for the current scenario.

Fields 170, 172, and 174 display the current values for the rate, concurrency, and duration parameters. These values can be changed using the Options drop down menu of the menu bar 142. For the duration parameter, the Options menu provides two choices, one for entering a total number of test scripts to be executed across all client connections (i.e., total number of completed sessions), and another to specify instead a start time and a stop time. When the latter method is to be used to specify the test run duration, the dialog box 284 of FIG. 8 is presented to the test operator. This dialog box allows the test operator to enter a start date and time and a stop date and time for the current test run. The duration, rate and concurrency parameters each have a default value of 1.

The test tool program of the present invention provides four options for logging information relating to a test run: Summary Log, Session Log, Event Log and Logging Off. A test operator selects one of these options for a given test run using a drop down list that appears when the operator clicks the button at the right end of field 180. The selected logging option is then displayed in field 180. The Summary Log option is the default. When any of the logging options other than Logging Off is selected, the test tool program will create a log file having a directory path and file name format of"Dr:Dir1Dir2Dir3hhmmss-o.txt", where "Dr" is the letter of the local disk drive on which the file is stored, "Dir1" is the directory name specified in field 184 of the environment portion of tab 144, "Dir2" is the current date specified in yyyymmdd format, "Dir3" is the name of the current scenario file, "hhmmss" is the time the log file is created specified in hours, minutes, and seconds, and "o" is a single character that identifies the selected logging option (o=S for Summary Log, o=X for Session Log, and o=E for Event Log). A maximum log file size can be selected using a drop down list provided by the button at the right end of field 178. Selectable values are 1, 2, 5, and 10 megabytes. The selected size is displayed in field 178. The default size is 2 megabytes. If the maximum log file size is reached during a test run, a new log file will be started. Thus, multiple log files may be created during a test run.

For every logging option other than Logging Off, the log file created during a test run will have a header containing (i) all test parameters, such as rate, concurrency, and duration, (ii) the name of the current scenario file, if applicable, (iii) all parameters associated with the current environment, (iv) the name of the current environment file, if applicable, (v) the user list file name, and (vi) a start date and time for the test run. Log files created for the different logging options all have a consistent number of columns marked by tab characters, so that they can be easily imported into a spreadsheet program, such as Microsoft® Excel.

The Summary Log option records information to a log file when a test run stops. The Summary Log summarizes the number of test scripts executed on each established client connection, as well as the number of errors encountered on each client connection.

The Session Log option records an entry at the end of every session (i.e., the completion of one test script) on every client connection. Each session entry includes a session number (successive sessions on a given client connection are numbered consecutively), the date and time of the end of the session, the elapsed time for the session, and the last command executed during the session (this is done because a session terminates when a particular command of the test script produces an error).

The Event Log option records an entry for each executed command on each client connection. This is the most detailed form of logging. For each command, the Event Log specifies the session number, the date and time of the command execution, the elapsed time for execution of the command, and the elapsed time for the session.

An environment consists of a port number, a network address, and a directory path for storage of log files. The port number is the connection port number of the server computer on which the application program to be tested is deployed. The network address is the address used to access the server computer on which the application under test is deployed. In the case of application programs deployed on the Internet, such as, for example, web application, the network address is an Internet protocol address having the form nnn.nnn.nnn.nnn, where nnn is a number having a value of from 0 to 255. All of these environment variables can be stored in an environment file, which in the present embodiment, has an extension of ".wde." A list of the last N environment file names is stored in the .INI file for the test tool program. The list is displayed in a window 182 of the Test Setup tab 144. A test operator can select one of the listed environment files by either double-clicking on the file name in the window 182, or by selecting the file using the File drop down menu in the menu bar 142. An exemplary environment file has the following contents:

```
[env]
port=80
addr=192.65.45.3821
logfile=C:\WT2_Logs\
```

Default values for various parameters are stored as preferences by the test tool program, and can be changed using the Preferences drop down menu in the menu bar 142. Preferences are stored in the test tool program's .INI file, and include: Preferences On (the preferences can be turned off, in which case no default values will be specified for any parameter), Default Rate, Default Concurrency, Default Duration (only when specified as total number of completed sessions), Log Option, Default Log Size, and Save Last Environment (automatically saves the last set of environment parameters as a default environment loaded at start up).

An exemplary .INI file for the test tool program might include the following contents:

```
[pref]
pref=1               ! preferences on or off
rate=1               ! default rate
concur=1             ! default concurrency
durat=1              ! default duration
logopt=Summary       ! default logging option
logsize=2            ! default log file max size (Mbytes)
saveenv=1            ! Save last environment option

[env]                ! last environment = default
port=80
addr=192.39.105.2
path=C:\WT2_logs\

[wds]                ! last 16 scenario files
scen1=C:\nz01a\umsg\nz01a_006.wds
scen2=C:\nz01a\umsg\nz01a_005.wds
scen3=C:\nz01a\umsg\nz01a_004.wds
scen4=C:\nz01a\umsg\nz01a_003.wds
scen5=C:\nz01a\umsg\nz01a_000.wds
scen6=C:\nz01a\umsg\nz01a_001.wds
scen7=C:\nz01a\umsg\nz01a_002.wds
scen8=C:\nz01a\umsg\timers03.wds
scen9=C:\nz01a\umsg\wds_004.wds
scen10=C:\nz01a\umsg\wds_008.wds
scen11=c:\nz01a\umsg\wds_010.wds
scen12=C:\nz01a\umsg\wds_002.wds
scen13=c:\nz01a\umsg\wds_007.wds
scen14=c:\nz01a\umsg\wds_000.wds
scen15=c:\nz01a\umsg\wds_006.wds
scen16=
[wde]                ! last 16 environment files
env1=C:\nz01a\umsg\nz01a_001.wde
env2=c:\nz01a\umsg\old_lab.wde
env3=c:\nz01a\umsg\ip243_33.wde
env4=c:\nz01a\umsg\ip223_229.wde
env5=c:\nz01a\umsg\alt_01.wde
env6=c:\nz01a\umsg\new_lab.wde
env7=c:\nz01a\umsg\new_lab2.wde
```

-continued

```
env8=c:\nz01a\umsg\log_on_a.wde
env9=c:\nz01a\umsg\main_env.wde
env10=c:\nz01a\umsg\alt_env.wde
env11=
env12=
env13=
env14=
env15=
env16=
```

Figure 3:
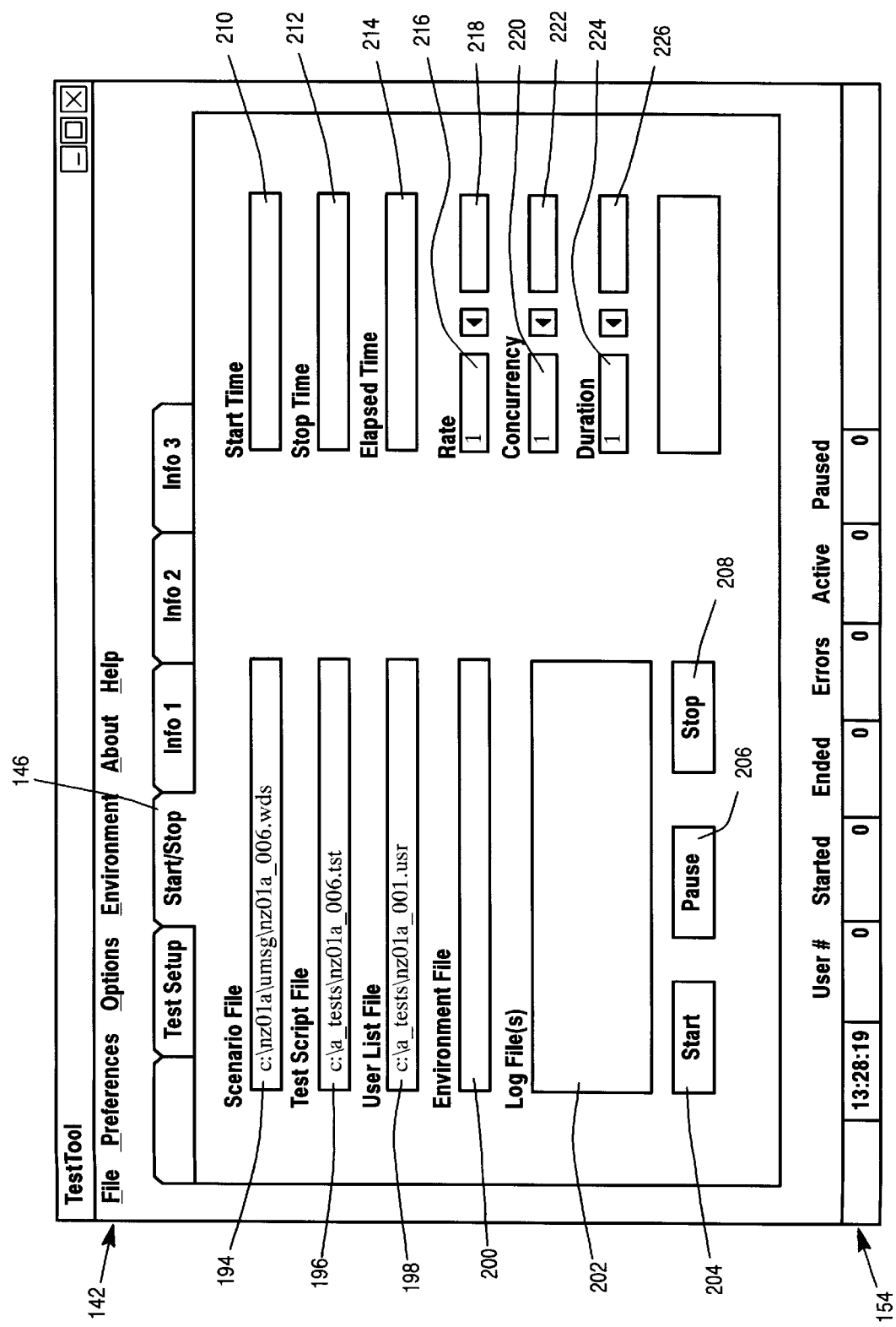
FIG. 3 shows a Start/Stop tab of the user interface of the application program test tool of the present invention.

When all of the information for the current scenario and environment have been provided, the Start/Stop tab 146 (FIG. 3) is enabled. The Start/Stop tab is used to start, pause, stop and/or modify a test run. Initially, the test script and user list file are displayed in fields 196 and 198, respectively. If these files were specified as part of a selected scenario file, the scenario file name is displayed in field 194. If an environment file was selected, its file name is displayed in field 200. The Log File(s) window 202 initially is blank. Log files are named at start time. The current values for the rate, concurrency, and duration parameters are displayed in fields 216, 220, and 224. Initially, a Start button 204 is enabled, and a Pause button 206 and a Stop button 208 are both disabled.

Clicking on the Start button 204 starts a test run based on the specified parameters. Once started, the Start button 204 becomes disabled and the Pause and Stop buttons 206, 208 are enabled. If the test operator has selected one of the three logging options other than Logging Off, the name of the first log file created for the test run will be displayed in the log file window 202. The start time of the test run is displayed in field 210. The status bar 154 displays information about the test run, so that the operator can be assured that it is running properly. At this point, the Test Setup tab and most of the drop down menus in the menu bar 142 are disabled.

Clicking on the Pause button 206 will pause the test run. Pausing disables the Pause and Stop buttons 206, 208. All active commands are completed before the test run is fully paused. Once paused, the Start button 204 becomes enabled. The test run can be resumed by again clicking on the Start button 204.

Clicking on the Stop button 208 stops the test run. Stopping disables the Pause and Stop buttons 204, 206. All active commands are completed before the test run is fully stopped. As each session on each client connection comes to a stop, the stopped time and elapsed time fields 212 and 214 are updated. Once completely stopped, the Start button becomes enabled.

Once a test run starts, most drop down menus in the menu bar 142 are disabled, including the Options drop down menu. The Test Setup tab 144 is also disabled. However, the rate, concurrency, and duration parameters can be modified while a test is running. To change one of these parameters, the test operator single-clicks in the text box to the right of the displayed parameter (i.e., box 218 for rate, box 222 for concurrency, and box 226 for duration). This will place a cursor in the box. The test operator can then enter a new value, and activate that new value by clicking on the arrow box ("<") next to the particular parameter field 216, 220, 224 being changed. If the new parameter value is valid, it will be displayed in the parameter field, and the text box will be cleared.

Figure 4:
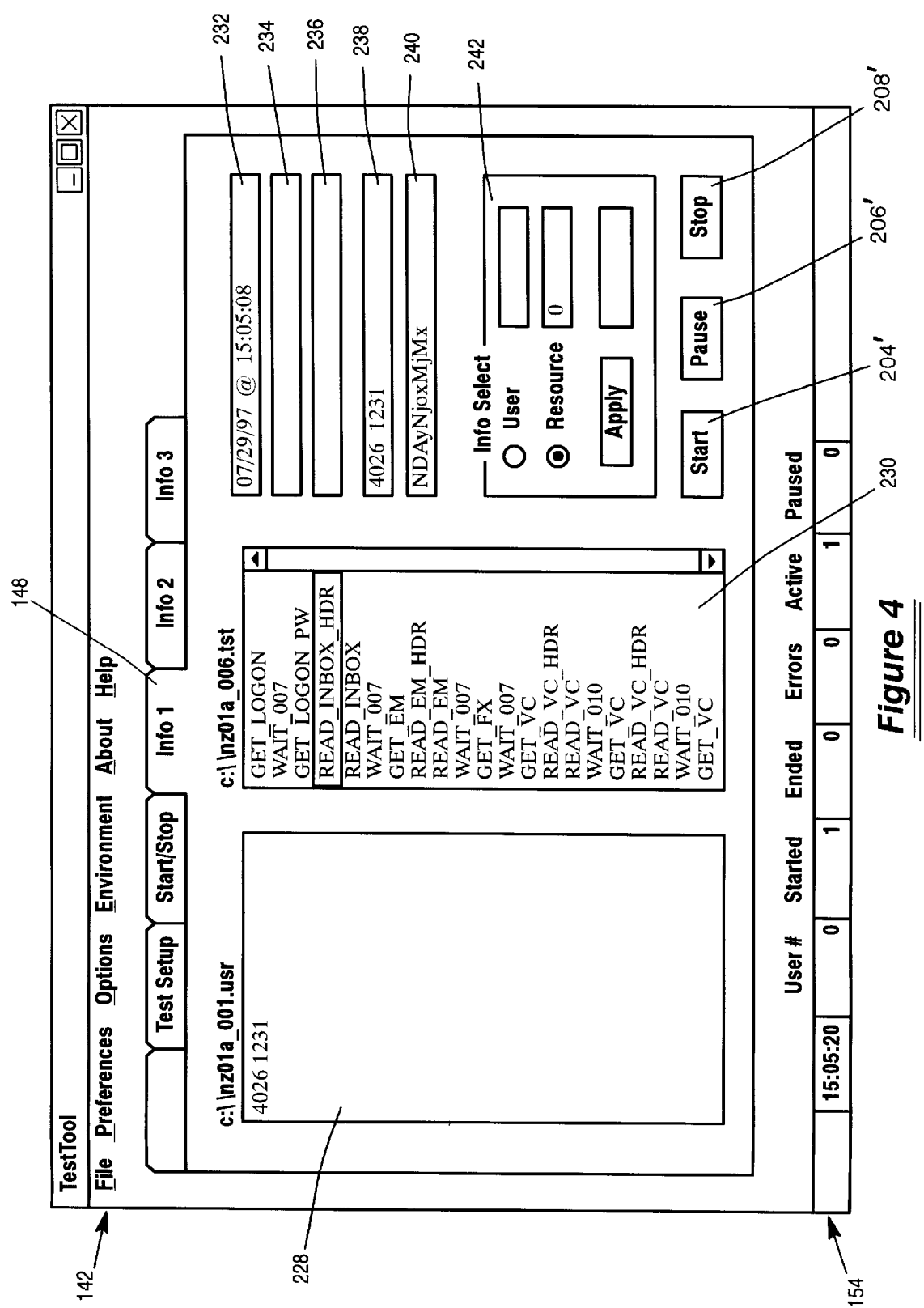
FIG. 4 shows a first information tab ("Info1") of the user interface of the application program test tool of the present invention, which provides information concerning the status of a test run.

Once a test run has been determined to be valid, i.e., all parameters are valid, the three information tabs 148, 150, and 152 are enabled. FIG. 4 shows the content and arrangement of information in the Info1 tab 148. The contents of the user list and test script for the test run are displayed in windows 228 and 230 of the Info1 tab 148, respectively. The start time, stop time, and elapsed time for the test run are displayed in fields 232, 234, and 236, respectively. These are identical to the fields 210, 212, and 214 of the Start/Stop tab 146.

For real time display, an Info Select box 242 of the Info1 tab allows viewing of information relating to one client connection at a time. A given client connection can be selected either by its absolute number during a test run (client connections are assigned consecutive numbers in the order that they are assigned by the test tool program), or by a number associated with a particular username in the user list file. In the Info Select box 242, "Resource" means client connection number, and "User" means the number associated with a particular username in the user list. Once the desired identification option is selected, the actual value is entered by the test operator in the text box to the right of the Apply button. The selection is activated by clicking on the Apply button, which causes the selection to be displayed in the field to the right of the selected option.

Once a selection has been made, the Info1, Info2, and Info3 tabs will provide information relating to the current session executing on the selected client connection. For the selected client connection, field 238 displays the username/password combination for the user assigned to that client connection, and field 240 displays a base64 encoding of that username/password combination. As mentioned above, not all application programs to be tested require a username/password combination to gain access to the program, and if that is the case for the application under test, the fields 238 and 240 may be blank. The test script command that is currently being executed on the selected client connection is highlighted in window 230. Additionally, the Info1 tab 148 provides a Start button 204', a Pause button 206', and a Stop button 208', which function identically to the Start, Stop, and Pause buttons 204, 206, and 208 on the Start/Stop tab 146.

Figure 5:
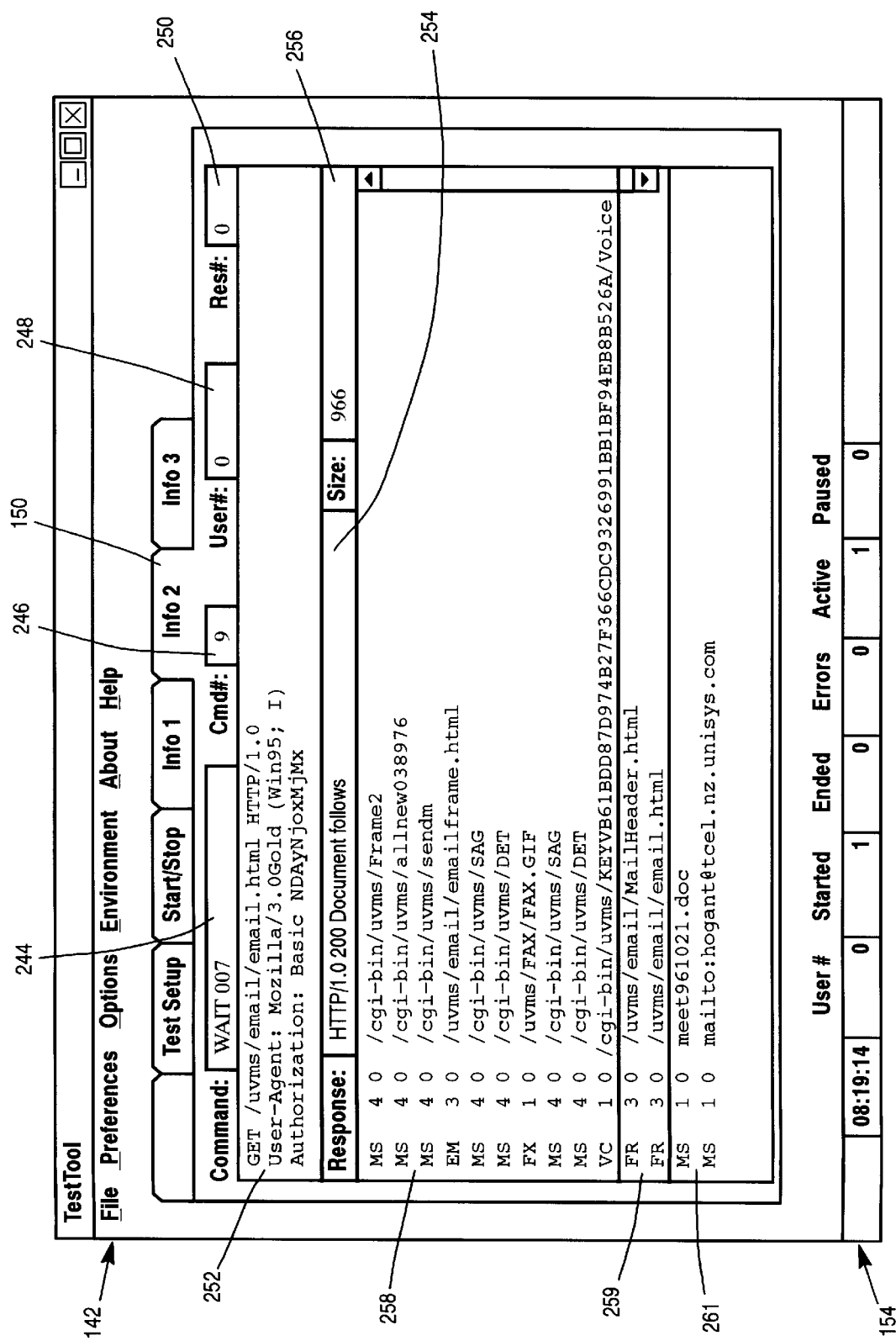
FIG. 5 shows a second information tab ("Info2") of the user interface of the application program testing tool of the present invention, which provides additional information concerning the status of a test run.

FIG. 5 shows the contents and arrangement of information provided by the Info2 tab 150. The information displayed in the Info2 tab is specific to the application program under test and to the particular command module and command set created for that application. There is, however, a general convention for displaying this information. The top line of the display shows the name of the current command being executed (field 244), the number associated with the command in the test script (field 246)(commands are treated as if numbered consecutively in the test script), the number associated with username/password assigned to the client connection being observed (field 248), and the number associated with the client connection (sometimes also referred to herein as a resource number)(field 250). The user number and/or client connection number are the ones selected using the Info Select box 242 of the Info1 tab 148 (FIG. 4). The command name and command number reflect the command that is highlighted in window 230 of the Info1 tab 148 (FIG. 4).

A first display window 252 of the Info2 tab displays the last request sent to the application program under test in response to a data requesting command. When the application under test is a web application, this request will be expressed in terms of the hypertext transfer protocol (HTTP). A field 254 displays the application program's response to the request. Only the first 40 characters of the response are shown. The size of the response, in bytes, is shown in field 256. In the case of a web application, all responses will include a status number immediately after the characters "HTTP/1.0." These status numbers are defined in the HTTP specification. A normal response typically has a status number of "200." The bottom three windows 258, 259, and 261 are used for displaying information received from the application program in response to the executed command.

Figure 6:
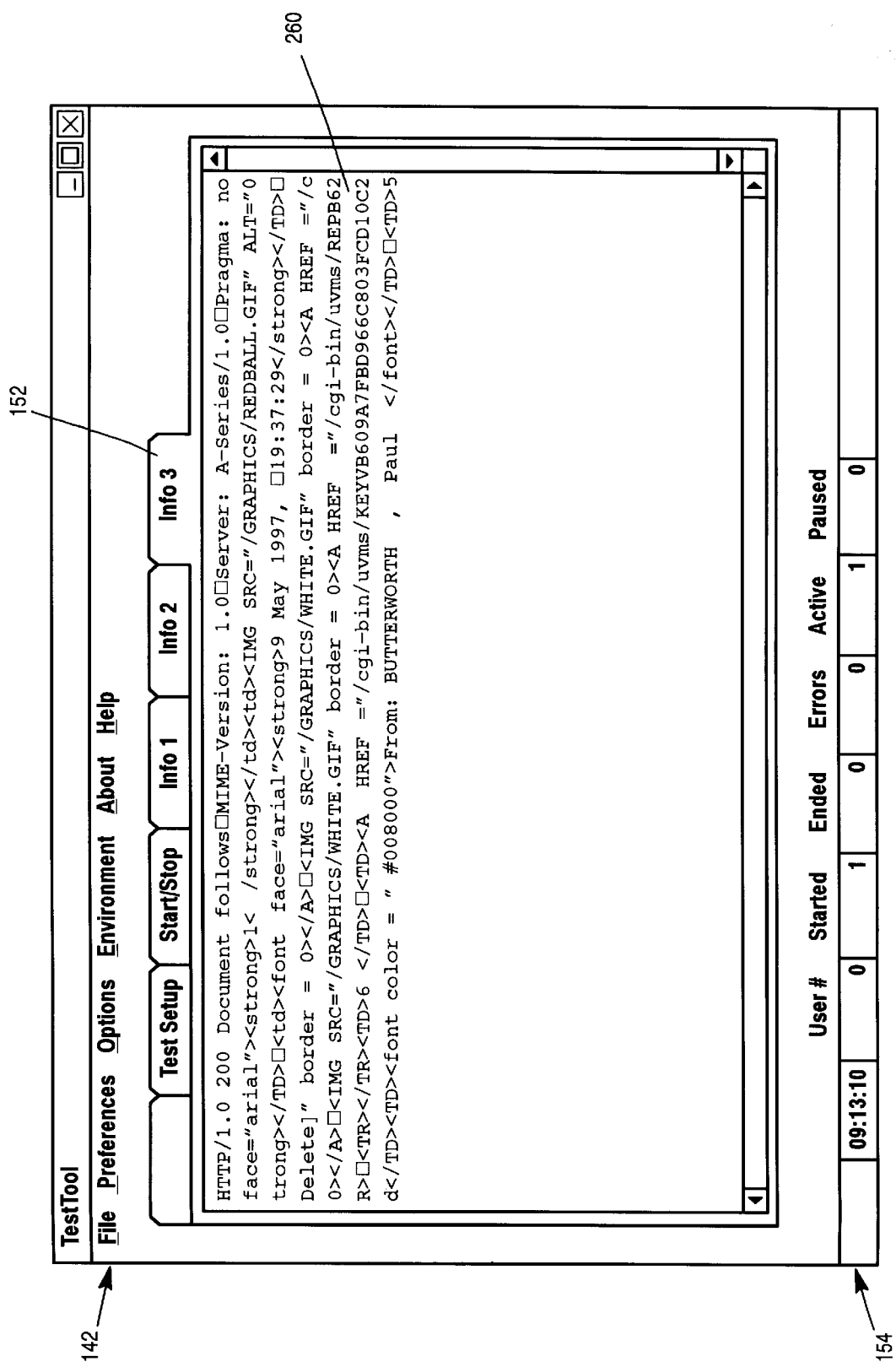
FIG. 6 shows a third information tab ("Info3") of the user interface of the application program testing tool of the present invention, which provides still further information concerning the status of a test run.

FIG. 6 shows the structure and arrangement of information displayed by the Info3 tab 152. Essentially, the Info3 tab 152 comprises a single window 260 that displays the complete response from the application program under test in an ascii format. FIG. 6 shows an exemplary HTTP response from a web application. As the foregoing illustrates, the test operator can use the Info1, Info2, and Info3 tabs 148, 150, and 152 to obtain detailed information concerning the response of an application program under test to any of the test script commands executed on a given client connection.

Figure 7:
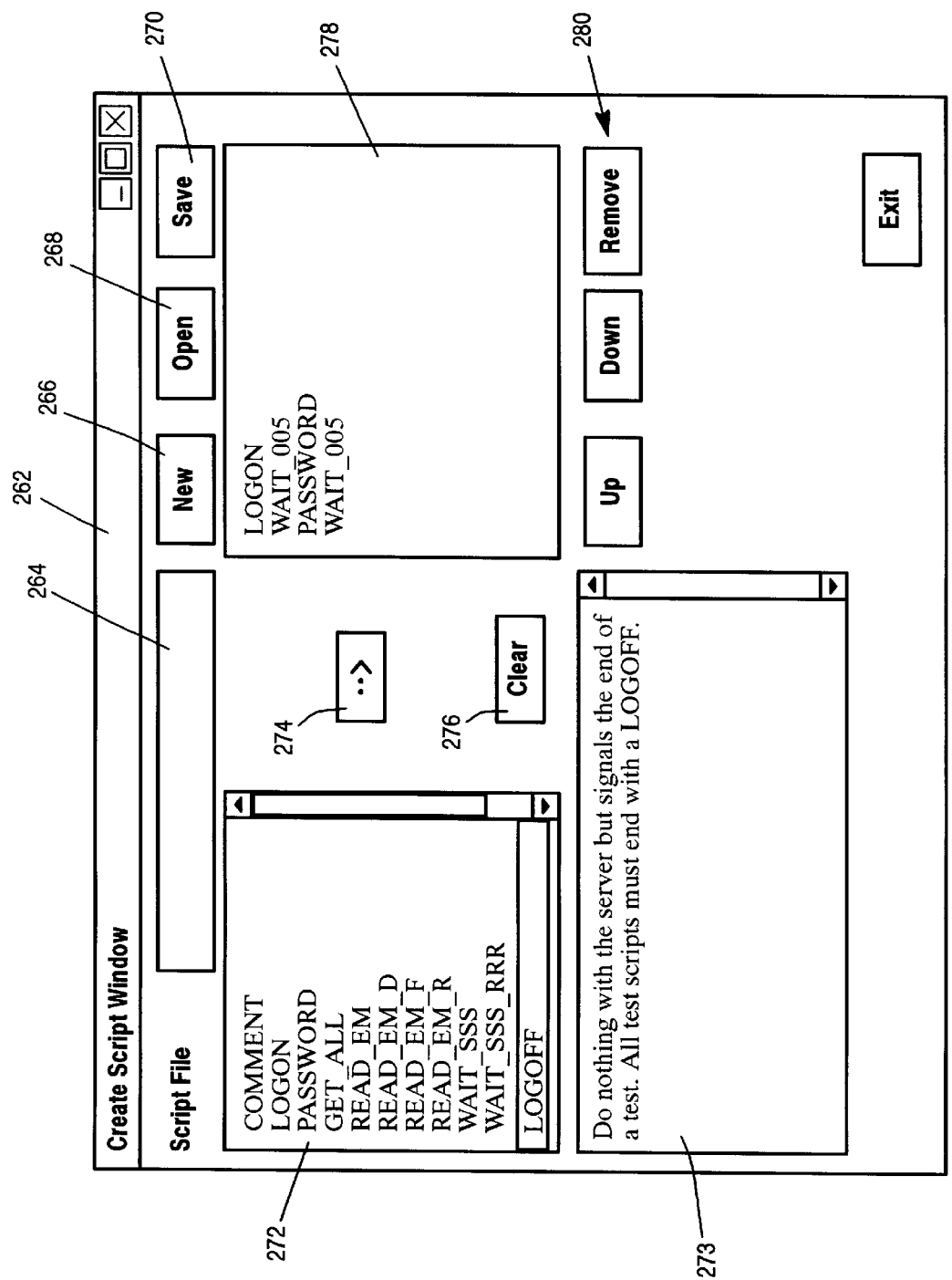
FIG. 7 shows a Create Script Window that is part of the user interface of the application program test tool of the present invention and that can be used by a test operator to create a test script from the available commands of the command module.

FIG. 7 shows the content and arrangement of a Create Script Window 262 that a test operator can use to generate a test script. Buttons 266, 268, and 270 can be used to create a new test script, open an existing test script, and save any modification made to either a new or existing test script. The file name of the test script being created or modified is shown in field 264 of the window 262. A list box 272 contains a list of all of the commands in the command module created for testing a given application program. An information box 273 can be used to display a brief description of the highlighted command. A test script can contain any combination of the available commands. A test operator can add a command to a test script by highlighting that command in the command window 272 and then clicking on button 274. This appends the highlighted command to the test script listing shown in the test script window 278. In the example shown, the test script being created has four commands—LOGON, WAIT_005, PASSWORD, and WAIT_005. The LOGON command could, for example, cause the computer running the test tool to connect to the server computer on which the application under test is deployed and to initiate access to the application program. The WAIT_005 command could then cause the computer to pause five seconds, simulating, for example, the time it takes a real user to read a logon screen of the application program under test. The PASSWORD command could then cause the computer to issue a username/password combination in order to gain access to the functions of the application program, followed by another WAIT_005 command, and so on. In the present embodiment, a test script can have up to fifty consecutive commands, in any order. A test operator can move up and down in the test script using the Up and Down buttons shown at 280, and can remove a particular command from the test script by highlighting its name in the test script window 278 and then clicking on the Remove button.

Figure 9:
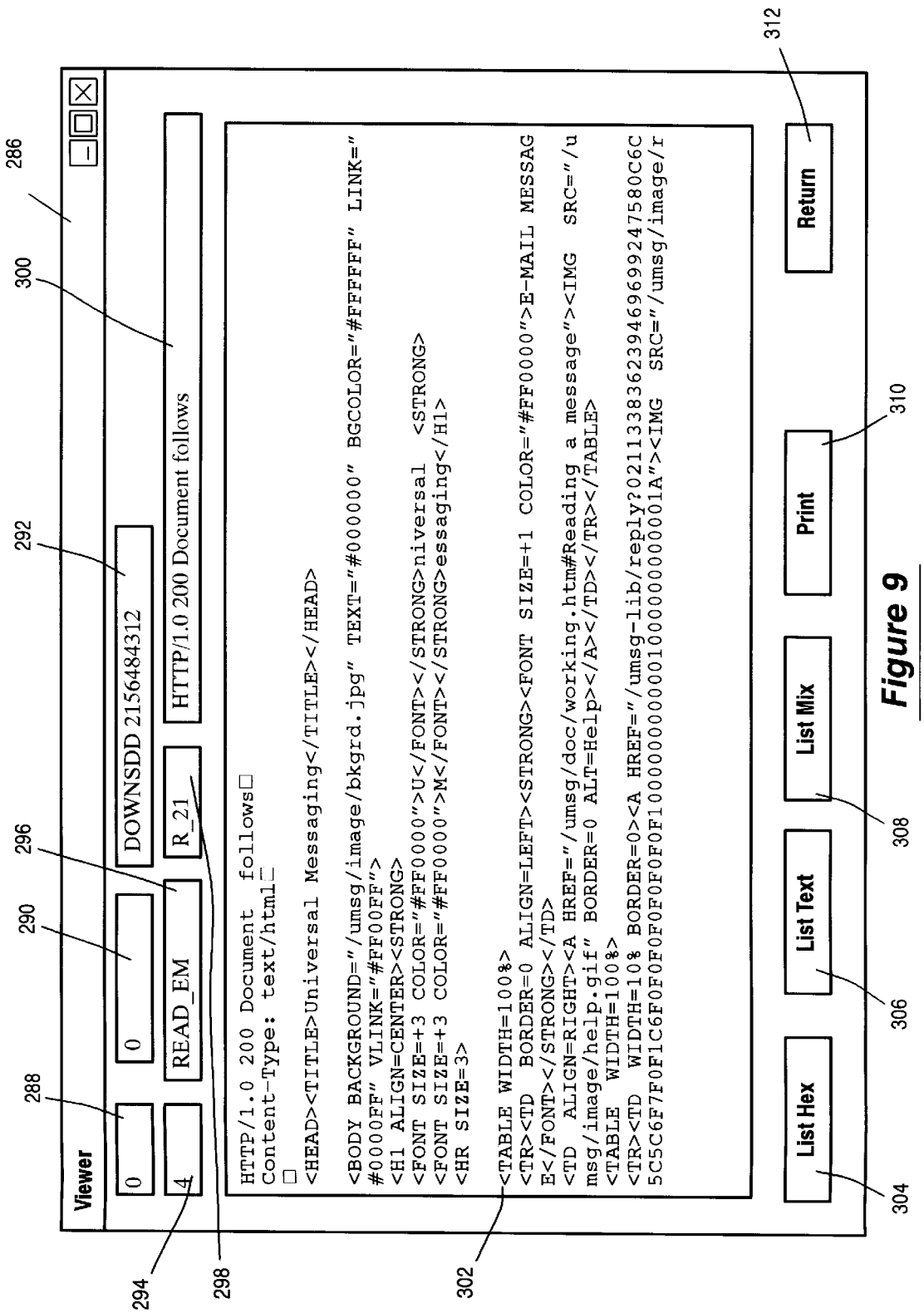
FIG. 9 shows a Viewer window of the user interface of the application program test tool of the present invention, which is used to view information concerning the execution of a particular command of a test script on one of the concurrent client connections created by the core module of the test tool.

FIG. 9 shows a Viewer window 286 that is particularly useful for displaying information during testing of a web application that presents different web pages to a user in response to different commands. The Viewer window will display information relating to the same command that is selected for viewing in the Info1, Info2, and Info3 tabs 148, 150, and 152, respectively. A field 288 specifies the number of the client connection being observed. A field 290 specifies the number associated with the username/password combination assigned to the selected client connection. A field 292 specifies the actual username and password for the user designated in field 290. A field 294 specifies the number associated with the current command in the test script. A field 296 specifies the name of the current command. Because command names have a string data type, they can be cumbersome for the test tool program to deal with internally. Consequently, the command module associates each command name with a unique, four character identification code that is used to identify that command internally to the program. A field 298 displays the internal, four character code for the current command. A field 300 displays the first 40 characters of the web application's response to an HTTP request issued during execution of the last command. This is the same information displayed in field 254 of the Info2 tab 150 (FIG. 5). Finally, a scrollable window 302 displays the HTTP/HTML source of the web page returned by the web application in response to the last HTTP request. Buttons 304, 306, and 308 can be used to specify whether the information in window 302 is displayed in a hex format, an ascii text format, or a combination of both, respectively. A button 310 can be used to print the contents of the Viewer window 286. A return button 312 returns the test operator to the main user interface of the test tool program. The View window 286 thus provides a combination of the information presented by the Info1, Info2, and Info3 tabs 148, 150, and 152, and is particularly useful in monitoring responses to HTTP requests in connection with the testing of a web application.

B. The Test Tool Program Structure

Figure 10:
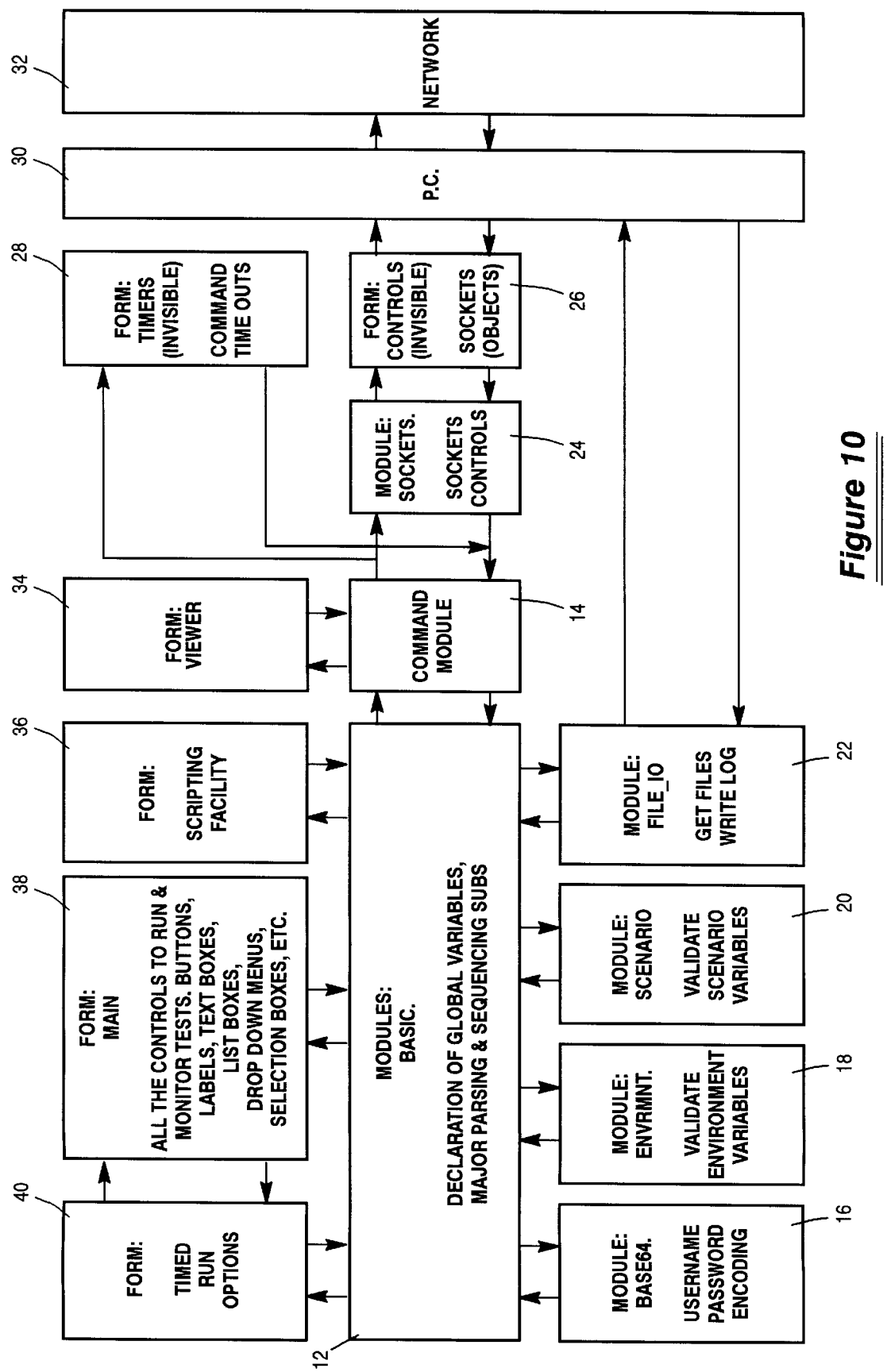
FIG. 10 is a block diagram illustrating a preferred embodiment of the functional structure of the computer program that comprises the test tool of the present invention.

FIG. 10 is a block diagram illustrating the structure of the program code of the test tool program. In the present embodiment, the test tool program is implemented using the Microsoft® Visual Basic 5.0 programming environment, and the program is designed to run on a personal computer or workstation 30 connected to a network 32 and employing either the Microsoft® Windows® 95 or Windows NT® operating system. In this embodiment, the program comprises a plurality of Visual Basic code modules and forms. Code modules and forms are the basic building blocks of a Visual Basic program. According to an important feature of the present invention, the test tool program comprises a command module 14 and a core module, which in the present embodiment, is collectively comprised of a plurality of separate Visual Basic code modules 12, 16, 18, 20, 22, and 24, and Visual Basic forms 26, 28, 34, 36, 38, and 40. The command module 14 is customized for each application program to be tested, and the core module serves as the main test engine.

1. The Command Module

In accordance with the preferred embodiment, the command module 14 contains a number of different commands, each of which performs a different user function of the application program under test. Each of the commands comprises a series of programmed instructions that cause the computer on which the test tool is running to perform a user function of the application program under test via a client connection to the application. For example, consider a case in which a web application that provides universal messaging functions to multiple users is to be tested. One command of the command module might establish connection to a home page of the web application. That web page might then present a number of options to the user, such as "help", "logoff", "retrieve mail," "compose mail," etc. To test each of these options, a unique command for that option must be coded in the command module.

As discussed above, each command is assigned a unique name, allowing a test operator to then create test scripts containing any desired sequence of command module commands using the simple names assigned to each command. No knowledge of the underlying programmed instructions of the command module is needed by a test operator, and the test scripts can be easily modified by adding or deleting command names from the script or by changing the order of command names in the script. Thus, programming expertise is only needed once—at the time the command module is programmed. The command module is rewritten and/or customized for each different application program to be tested.

Additionally, as described hereinafter in greater detail, according to another important feature of the present invention, each command comprises an execution segment and a verification segment. The execution segment contains instructions for performing a particular user function of the application program under test, and the verification segment contains instructions for verifying, at the computer running the test tool program, whether that user function was performed correctly by the application program. More specifically, the verification segment of each command module command parses a user interface object associated with the user function to test whether expected elements of the user interface object appear in response to execution of the user function. This enhanced level of command verification ensures that all errors are logged, and does not rely solely upon the error notification features of the web application itself.

In the present embodiment, the command module is implemented as a Visual Basic 5.0 code module. Each command of the command module comprises a Visual Basic subroutine that contains the instructions for the execution segment of the command, and a Visual Basic function that contains the instructions for the verification segment of the command. In addition to the execution and verification subroutines and functions for each command, the command module contains an Encode_Command subroutine, a DO_COMMAND subroutine, and a VER_COMMAND subroutine. The Encode_Command subroutine translates each command name in the active test script into a four-character code that is then used internally by the program to speed internal decoding of each command. The Encode_Command is called once by the core module at the start of a test run. The DO_COMMAND subroutine (see steps 54–56 of FIG. 11, described below) receives the four-character code of a command to be executed, decodes the four-character code in order to identify the appropriate command execution subroutine to call, and then calls that subroutine to begin the execution segment of the command. The VER_COMMAND subroutine (see steps 90–92 of FIG. 11) is similar to the DO_COMMAND subroutine. It decodes the four-character code of the current command to identify, and then to call, the subroutine that performs the verification segment of the command.

Commands of the command module are of two types—interrupt soliciting commands and logical commands. Interrupting soliciting commands include a WAIT command (described below) and all other commands that perform a user function of the application program under test via a network event—a communication with the application program via a client connection (e.g., an HTTP request in the case of a web application under test). As described below in greater detail, these types of commands are reentrant via an interrupt; that is, they pass control back to the host operating system after completion of the network event (or the enabling of a timer in the case of a WAIT command), and then do not reenter execution until either an interrupt is received from the client connection, indicating that a response to the network event has been received, or a time-out interrupt occurs.

Figure 12:
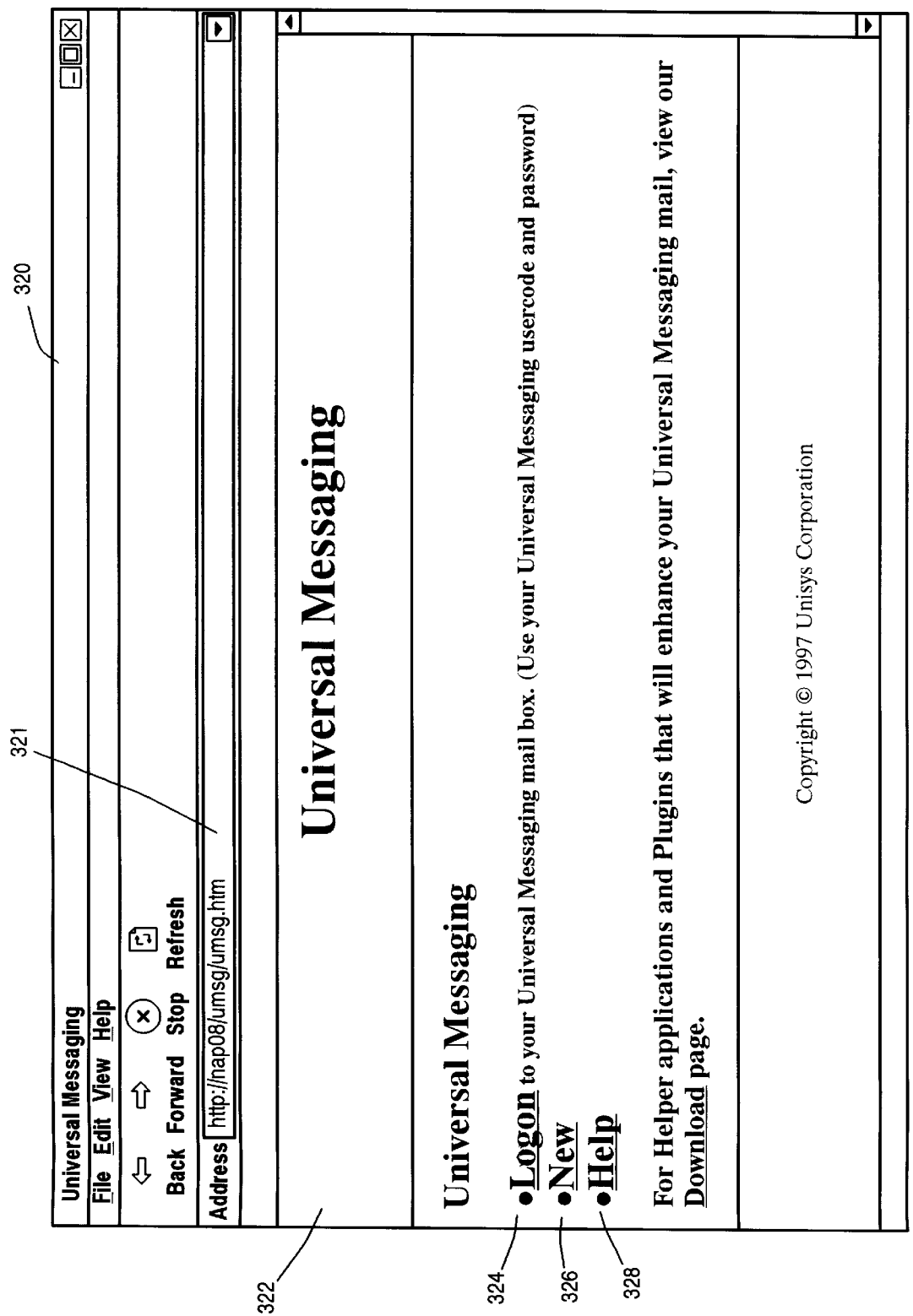
FIG. 12 is a main page of an exemplary web application that provides universal messaging services, as displayed in a window of a standard web browser program, such as, for example, Microsoft® Internet Explorer or Netscape Navigator.

The coding of interrupt soliciting commands is best described by way of example. FIG. 12 shows an initial web page 322 of an exemplary web application that the test tool program of the present invention can be used to test. The exemplary web application provides universal messaging functions to any number of users. Users can logon to their respective "mail boxes" to review and send e-mail, voice-mail, and/or fax messages. A real user would interact with the web application using a standard web browser 320, such as, for example, Microsoft® Internet Explorer or Netscape Navigator. In normal use, a user connects to this web page 322 by entering, in an address text box 321 of the web browser 320, the Uniform Resource Locator, for the web page. The browser then formulates an HTTP request, e.g., "http://nap08/umsg/umsg.htm", where "nap08" is a domain name that resolves into the IP address of the server computer on which the web application is deployed. The HTTP request is transmitted to the web application via the network 32 over an established client connection to the web application. The web application will then transmit a response back to the user comprising the HTML source code of the web page, which the user's browser then translates and displays to the user.

In the example of FIG. 12, the web page 322 itself represents a user interface object of the web application, and it provides other user interface objects to the user, including, for example, a "Logon" object 324, a "New" object 326, and a "Help" object 328. Each of these objects represents a different user function of the web application. The Logon object 324 allows an existing user to logon to the user's mailbox using his/her username and password, the New object 326 allows new users to establish mailboxes on the system, and the Help object 328 provides a help facility. Each object 324, 326, 328 comprises a hypertext link to either another web page of the web application, or to a Common Gateway Interface (CGI) program of the web application.

Figure 13:
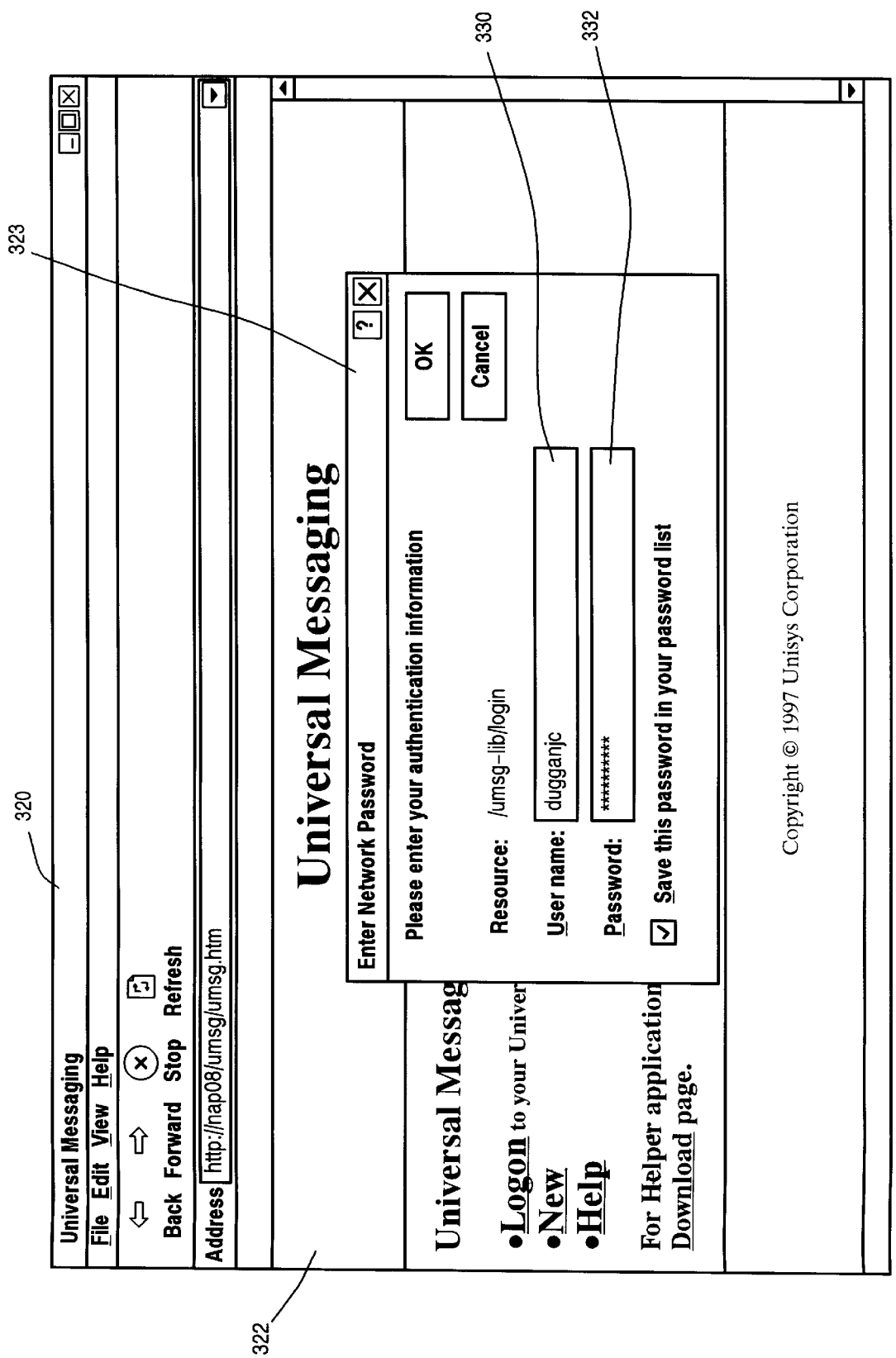
FIG. 13 shows an Enter Network Password user interface object of the exemplary web application of FIG. 12, with which a user may interact to perform an enter password function of the web application.
Figure 14:
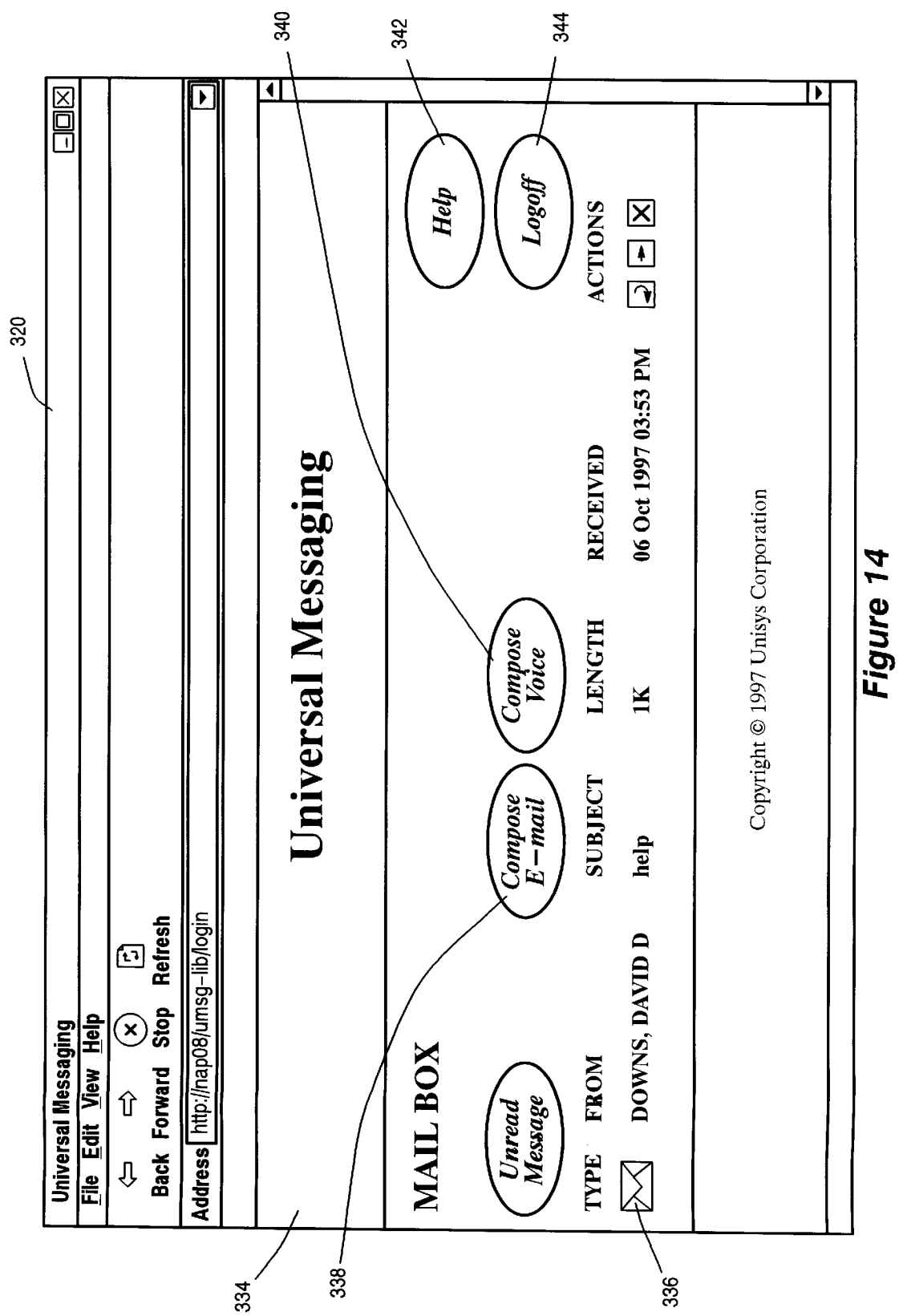
FIG. 14 shows a Mail Box user interface object of the exemplary web application of FIG. 12, with which a user may interact to perform a number of different user functions of the web application.

FIG. 13 shows the response of the web application to a user clicking on the Logon object 324. Such action causes an "Enter Network Password" form 323 to be presented to the user. The user then fills in the User name and Password boxes 330, 332 and clicks the OK button. The Enter Network Password form 323 represents yet another user interface object of the web application. Upon detecting the click of the OK button, the user's web browser 320 formulates another HTTP request to the web application, which passes the user name and password to the web application (after encoding the combination using the base64 encoding technique) along with the name of a CGI program that verifies the username and password from a database of valid users. The web application executes the CGI program, and if the username and password are valid, responds by transmitting a new web page 334, shown in FIG. 14. This next web page 334 represents another user interface object of the web application—the user's mail box. The mail box 334 provides a list of messages, e.g., message 336, that the user has received, and provides a number of user functions that the user can perform. For example, the user can compose an e-mail message to another user by clicking on a Compose E-mail object 338, can compose a voice message by clicking on a Compose Voice object 340, can receive help information by clicking on a Help object 342, or can logoff the current mail box 334 by clicking on a Logoff object 344.

According to the present invention, a command can be written in the command module to perform any or all of the user functions provided by the web application. The execution segment of each command simulates a real user's interaction with one of the user interface objects of the web application, by generating an appropriate request—an HTTP request in this example—and sending the request to the application under test via a client connection to the application. These kinds of commands are called interrupt soliciting commands, because the execution segments of these commands generate network events (i.e. requests submitted to an application under test via a client connection) that suspend execution of the active session until an interrupt is received. The verification segment of the command then verifies that the web application performed the requested function by parsing the response received from the web application to ensure that expected elements of the response are present. This enhanced level of command verification ensures that all errors are logged, and does not rely upon the error notification features of the web application itself, as is the case in the prior art.

As mentioned above, each coded command is assigned a unique command name that a test operator can then use to create test scripts. To speed the decoding of each command, each command name is encoded at the start of a test run with a unique four-character code that is easier and more quickly interpreted by the DO_COMMAND and VER_COMMAND subroutines of the command module. Example interrupt soliciting commands (identified by command name and associated four-character code) that might be created for testing the various user functions of the exemplary web application of FIGS. 12–14 include:

| Command Name | Code | Description |
| --- | --- | --- |
| PASSWORD | O_23 | logon with username/password |
| LOGOFF | O_24 | logoff (object 344 of FIG. 14) |
| READ_EM | R_21 | get an e-mail message |
| COMPOSE_EM | C_00 | compose e-mail(object 338 of FIG. 14) |
| WAIT_SSS | T_01 | wait SSS seconds |
| WAIT_SSS_RRR | T_02 | wait SSS +/− RRR seconds (random) |

Code listings for the execution segment (DO_LOGOFF subroutine) and verification segment (VER_LOGOFF function) of the LOGOFF command are provided below, as an example of how a particular user function is coded as a command in the command module:

```
01   Public Sub DO_LOGOFF(Index)

02     Dim num1 As Integer
03     Dim num2 As Integer
04     Dim req As String
05     Dim DO_OK As Integer
06     Dim abc As String 07     DO_OK = 0          ' not ok until ok
08     For i = 0 To MB_HREFs(Index) −1
09       If Left(MB_HREF_Type(Index, i), 2) = "MS" Then
10         num1 = InStr(1, MB_HREF(Index, i), "logoff?", 0)
11         If num1 > 0 Then ' found logoff href
```

-continued

```
12            If MB_HREF_Stat(Index, i) = 4 Then
13              MB_HREF_Stat(Index, i) = 5 ' mark in progress
14            Else
15              DO_OK = 0 ' lost
16              Exit For
17            End If
18            MB_HREF_Ptr(Index) = i ' tell VER_LOGOFF where
19            HTM_File = MB_HREF(Index, i)
20            DO_OK = 1
21            Exit For
22          End If
23        End If
24     Next i 25     If DO_OK = 1 Then       ' do read
26        REQ_PT_1 = "GET " & HTM_File & " HTTP/1.0" & NL$
27        REQ_PT_2 = "User-Agent: Mozilla/3.0Gold (Win95; I)" & NL$
28        REQ_PT_3 = "Authorization: Basic" & RES_EUCPW(Index)& NL$
29        SendString(Index) = REQ_PT_1 & REQ_PT_2 & REQ_PT_3 & NL$ 30        RES_ERR_TYPE(Index) = 0 ' start sequence clean
31        CmdTimers!CmdTimer(Index).Interval = 60000 '60s time out
32        CmdTimers!CmdTimer(Index).Enabled = True
33        RES_TIME_VAL(Index) = 60000
34        RES_TIME_MULT(Index) = 1
35        HTML_BUF(Index) = ""

36        get_hw Index           ' get the frame

37     Else                      ' no read to do
38        RES_ERR_TYPE(Index) = 20 ' 20 = broke
39        CmdTimers!CmdTimer(Index).Interval = 500 ' .5s delay
40        CmdTimers!CmdTimer(Index).Enabled = True
41        RES_TIME_MULT(Index) = 0
42     End If
43  End Sub 44  Public Function VER_LOGOFF(Index)
45     Dim num1 As Integer
46     Dim num2 As Integer
47     Dim num3 As Integer
48     Dim num4 As Integer
49     Dim parse As Integer
50     Dim tmp_txt As String
51     Dim type_txt As String 52     On Error GoTo VER_LOGOFF_error 53     ' check off end of logoff
54     num1 = MB_HREF_Ptr(Index)
55     If MB_HREF_Stat(Index, num1) = 5 Then
56        MB_HREF_Stat(Index, num1) = 4 ' mark back to idle
57     Else
58        ' wrong one, error
59        VER_LOGOFF = 99
60        Exit Function
61     End If 62     num1 = 1 ' starting point for text 63             ' Logon starts the message
64     num2 = InStr(num1, HTML_BUF(Index), "Logon", 0)
65     If num2 = 0 Then ' could not find
66        VER_LOGOFF = 1     ' bad return
67        Exit Function
68     Else
69             ' Help ends the message
70        num3 = InStr(num2, HTML_BUF(Index), "Help", 0)
71        If num3 = 0 Then   ' could not find
72           VER_LOGOFF = 24  ' bad return
73           Exit Function
74        End If
75     End If 76     VER_LOGOFF = 0 ' good return
77     Exit Function
78  VER_LOGOFF_error:
79     VER_LOGOFF = 99
80  End Function
```

Lines 07–24 of the DO_LOGOFF subroutine locate the HREF for the Logoff user interface object 344 in the mail box 334. Lines 25–29 create the HTTP request to be sent over the client connection to perform this user function. Lines 31–35 set up a timer to establish a time-out period (see step 72 of FIG. 11, discussed below). Line 36 opens the client connection (i.e., a Windows® socket) for the current session, and causes the HTTP request to be sent via the connection to the web application. Lines 37–42 create a short time-out period to generate a quick interrupt in the event that the HREF of the Logoff user interface object could not be found during the search sequence of lines 07–24, so that an error can be reported.

If the Logoff function is performed properly by the web application, the web application should respond by sending the initial web page 322 (FIG. 12) back to the user. The HTML source for this web page 322 will include the text "Logon" for user interface object 324, followed at some point by the text "Help" for user interface object 328. The VER_LOGOFF function, lines 44–80, parses the HTML source received by the test tool program in response to the Logoff request, to verify that the text "Logoff" (lines 62–68) and the text "Help" (lines 69–75) are present in the received response. If either element is missing, the VER_LOGOFF function assumes that an incorrect response was received and reports an error. Thus, the verification segment (VER_LOGOFF function) of the LOGOFF command parses a user interface object associated with the Logoff user function of the application under test to verify that expected elements of that user interface object are present in the response received from the application program.

An exemplary code listing for an execution segment (DO_WAIT subroutine) that handles both the WAIT_SSS and WAIT_SSS_RRR commands is provided below as another example. In the present embodiment, the WAIT_SSS and WAIT_SSS_RRR commands do not have a verification segment, as these commands do not interact with the web application via the client connection. They do, however, solicit a time-out interrupt, and are therefore classified as interrupt soliciting commands. In the present embodiment, these commands are not application specific, but rather, are generic to all application programs and can be used in any command module.

```
10    Public Sub DO_WAIT(Index, N1, N2)
11        Dim pls_mns As Integer

12        RES_TIME_VAL(Index) = 60000
13        RES_TIME_MULT(Index) = 0

14        If N2 = 0 Then ' no +/-
15            CmdTimers!CmdTimer(Index).Interval = N1 * 1000
16            CmdTimers!CmdTimer(Index).Enabied = True
17        Else
18            N1 = N1 * 1000
19            N2 = N2 * 1000 * Rnd
20            If N2 >= N1 Then
21                N2 = N1 - 500
22            End If 23            pls_mns = (2000 * Rnd) \ 1000
24            If pls_mns = 2 Then
25                pls_mns = 1
26            End If 27            If pls_mns =0 Then
28                CmdTimers!CmdTimer(Index).Interval = N1 - N2
29            Else
30                CmdTimers!CmdTimer(Index).Interval = N1 + N2
31            End If
32            CmdTimers!CmdTimer(Index).Enabled = True
33        End If 34    End Sub
```

In this listing, the parameters N1 and N2 correspond to the "SSS" and "RRR" values, respectively, in the command names WAIT_SSS and WAIT_SSS_RRR. When the WAIT_SSS command is to be executed, N2=0, and lines 14–17 of this subroutine simply set up a timer to generate an interrupt after the specified number of seconds (see step 72 of FIG. 11, described below). The WAIT_SSS_RRR command randomly waits either SSS+RRR seconds or SSS-RRR seconds. Lines 18–26 create a random value "pls_mns." Based on the value of that random value, the timer is either set up with a value equal to N1−N2 (line 28) or a value equal to N1+N2 (line 30).

As the foregoing examples illustrate, commands can be coded to perform any user function of the application program under test. Simple command names are assigned to each command to hide the complexity of the command code from a test operator. The test operator can create test scripts containing any desired sequence of command names, without knowledge of the underlying programmed instructions needed to carry out that command. The test operator only needs to know which user function of the application program each command name performs.

Logical commands, in contrast to interrupt soliciting commands, are not reentrant; they do not wait for any form of interrupt. Logical commands can be used to perform logical operations, such as locating certain text in the body of a response from an application program under test, or verifying that certain text is not present in an expected response. Other logical commands can be used to ignore errors that the test operator expects the application program to issue in response to a certain command, or to verify that an expected error has occurred. Logical commands may or may not represent actual steps that a real user of the application under test would perform. In the present embodiment, the following are examples of logical commands:

```
EXPECT_EEEEE
IGNORE_EEEEE
FIND_TEXT_TT
NEXT_TEXT_TT
DONT_FIND_TT
DONT_NEXT_TT
```

The EXPECT_EEEE command examines a variable (called Stat 1, see below) that contains the error code, if any, generated in response to the execution segment of a command, and compares the value in that variable to an expected error code, where EEEE is the expected error code. The IGNORE_EEEE command compares an expected error code, EEEE, to the value in Stat1, and if the codes match, resets Stat1 to a value of "0", effectively causing the error to be ignored.

For the FIND_TEXT_TT, NEXT_TEXT_TT, DONT_FIND_TT and DONT_NEXT_TT, "TT" is the specified text. FIND_TEXT_TT will search for the specified text anywhere in the response received from an application program under test. NEXT_TEXT_TT will search for the next occurrence of the same text. DONT_FIND_TT will verify that the specified text is not present in a response, and DONT_NEXT_TT will verify that there are no more occurrences of the text previously located by the FIND_TEXT_TT command.

These logical commands can be used, for example, to perform certain kinds of verification not otherwise handled by the verification segment of a given command. For example, suppose that an application program under test provides the capability to send and receive e-mail. One command in the command module might be a GET_EMAIL command that requests the application program to return the contents of a particular e-mail listed in a user's in-box. The execution segment of the GET_EMAIL command would cause the request to be issued to the application program over a client connection. The application program would then respond by sending the contents of the e-mail to the test tool program via the client connection. The verification segment of the GET_EMAIL command might then perform generic verification steps to ensure, for example, that the contents of the e-mail message include the text "To," "From," and "Date", which are expected to be present in all e-mail messages. Thus, the verification segment of the GET_EMAIL command would verify that the response was indeed an e-mail message. Suppose, however, that a test operator wants to verify that a particular e-mail message was received, having the text "Hello" in the body of the message. A logical command can be used for this form of specific verification. For example, the FIND_TEXT_TT command could be used to verify that the text "Hello" is present in the body of the received message. Logical commands may or may not be application specific.

2. The Core Module

The core module of the program is independent of the command module. It performs the core functionality of the test tool and does not have to be rewritten for different application programs to be tested. In accordance with the present invention, the core module causes the single computer on which the test tool program is running to execute concurrently, on each of a plurality of different client connections to the application program under test, the series of command module commands specified by name in the active test script. The core module also handles the user interface functions of the test tool program. As mentioned above, in the present embodiment, the core module is collectively comprised of a plurality of separate Visual Basic code modules 12, 16, 18, 20, 22, and 24, and Visual Basic forms 26, 28, 34, 36, 38, and 40.

The basic module 12 contains the core code that controls overall program flow. It handles the execution of a test run based on a test scenario and environment, including a user list and test script, and the parameters of rate, concurrency, and duration. The basic module 12 is also responsible for creating entries for the log files. However, a separate file_IO module 22 handles the actual file I/O operations used to write information to the log files. The basic module 12 is also responsible for initiating multiple, concurrent sessions on different client connections to the application program (the maximum number of which is controlled by the concurrency parameter). Each session is executed as a separate thread and the program code that handles execution of each session is reentrant. It is the multi-threaded, reentrant nature of the test tool program code that allows multiple sessions to execute concurrently, enabling a test operator to stress the application program under test to almost any degree. Further details of the multi-threaded, reentrant nature of the test tool program code are provided in connection with the description of the flow diagram of FIG. 11.

For those application programs that require a username and password combination to gain access to the functions of the application, a base64 module 16 is provided for encoding the username and password combinations listed in the active user list using the standard base64 method typically employed by such applications. When a command module command contains instructions to send an encoded username/password combination to an application program under test, the base64 module 16 is called to perform the encoding prior to sending the data to the application. According to the base64 encoding technique, a given username and password are combined into a single ascii string, with a colon character (":") between them. That string is then encoded using the base64 algorithm.

The environment module 18 validates the environment parameters specified in the environment portion 158 of the Test Setup tab 144, and creates a directory and file structure for the log files, as also specified in the Test Setup tab 144. Specifically, the environment module 18 first validates the host name of the server computer on which the application program under test is deployed (and to which the test tool program will connect to test the application). In the case of an application program deployed on a server connected to the Internet, the host name is the Internet host name. The environment module 18 next validates the network address of the server computer, which, in the case of a server connected to the Internet, is the Internet Protocol Address of the server computer. Third, the environment module 18 validates the port number of the server computer. Finally, it creates the directory and file structure specified in field 184 of the Test Setup tab.

The scenario module 20 validates all of the scenario parameters specified in the Test Setup tab 144, including the scenario, test script and user list file names, and the rate, concurrency, and duration parameters. With respect to rate, concurrency, and duration, the module 20 ensures that the values specified in the Test Setup tab 144 are all within the bounds described above. If a test operator has specified the duration of a test run in terms of a start time and a stop time, the scenario module 20 verifies that they are valid times. For example, the module 20 checks to make sure that the specified start time is earlier than the specified stop time. With respect to the scenario, test script, and user list files, the module 20 verifies that the specified files exist.

The file_IO module 22 handles all file input/output operations for reading and writing the test script, user list, and log files.

A sockets module 24 provides an interface between the command module and a Visual Basic form 26 (invisible to the test operator) containing multiple instances of a Visual Basic custom control for allocating a resource—in this case a Microsoft® Windows® socket—to establish each client connection to the application program under test. One instance of the custom control is used to control each client connection, up to the maximum number of allowed connections, which in the present embodiment is 300 connections. Specifically, each custom control controls one Microsoft® Windows® socket, and each socket, or resource, provides one client connection to the application program under test. In the present embodiment, the custom controls are implemented using the Internet Pack of Custom Controls for Visual Basic, commercially available from Mabry Software, Inc., Seattle, Wash. 98103. However, suitable custom controls can be obtained from numerous other vendors as well.

Another Visual Basic form invisible to the test operator—timers form 28—contains multiple instances of a timer object that can be allocated to perform timer-related functions for different sessions or client connections. One use of the timer object is to establish a time-out period that, if exceeded, is interpreted as a failure of a command module command to execute properly. In the present embodiment, a value of 30 seconds is used for the time-out period. A second use of the timer object is in connection with the WAIT command described above. The WAIT command is used in a test script to simulate the time it takes a real user to, for example, read a web page of a web application under test. Concurrency depends on these simulated wait periods, as it is during a wait period of one session that another session can gain control (through reentrancy) of the test tool program to execute a command of that session.

The remaining Visual Basic forms 34, 36, 38, and 40 handle the user interface features of the core module of the test tool program. The viewer form 34 handles the creation and operation of the Viewer window 286 described above and shown in FIG. 9. The scripting facility form 36 creates and operates the Create Scripts Window 262 described above and shown in FIG. 7. Scripts can also be created using any text editor or wordprocessor, so long as the files are saved in ascii text format. The main form 38 creates and controls the operation of the five tabs 144, 146, 148, 150, and 152 of the main user interface. The main form 38 also creates and controls the menu bar 142 and status bar 154. As described above, the menu bar 142 provides standard drop down menus to perform file, preferences, options, and help functions. The status bar provides a snapshot of the status of a test run. The timed run options form 40 creates and controls the Time Options dialog box 284 described above and shown in FIG. 8.

As explained above, the Visual Basic modules 12, 16, 18, 20, 22, and 24 and the Visual Basic forms 26, 28, 34, 36, 38, and 40 collectively comprise the core module of the test tool program. The core module serves as the main test engine of the test tool program. Unlike the command module, the code of the core module is not application specific and is not rewritten nor modified for different application programs to be tested. It serves as the generic test engine in all cases.

With the foregoing program structure, different command modules can be created for different application programs to be tested. Once a command module is created, a test operator can create any number of different test scripts to test the various functions of the application program under test. Test scripts can easily and quickly be generated using the simple names assigned to each command of the command module. This hides the complexity of the command functionality from the test operator, and provides the operator with complete control over the sequence and length of the test to be performed. Test operators do not need to have any programming expertise—only knowledge of the different user functions that each command performs. Programming expertise is needed only once—at the time of command module creation. Thus, the present invention provides a simple, easy-to-use, yet powerful tool for testing multi-user application programs such as client/server and web-based applications.

C. Test Tool Program Operation

Figure 11:
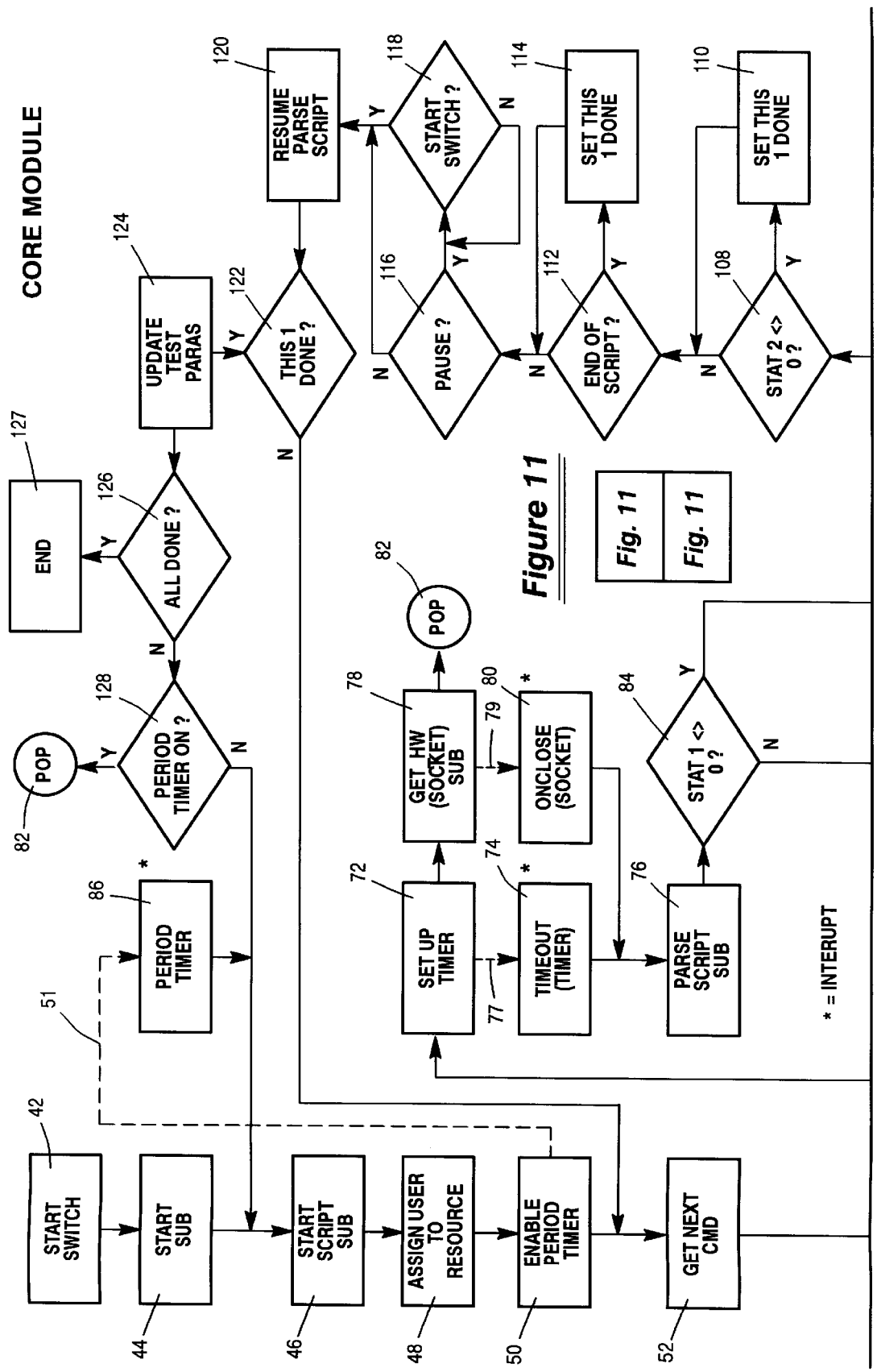
FIG. 11 is a flow diagram illustrating the operation of the computer program of FIG. 10.
Figure 11:
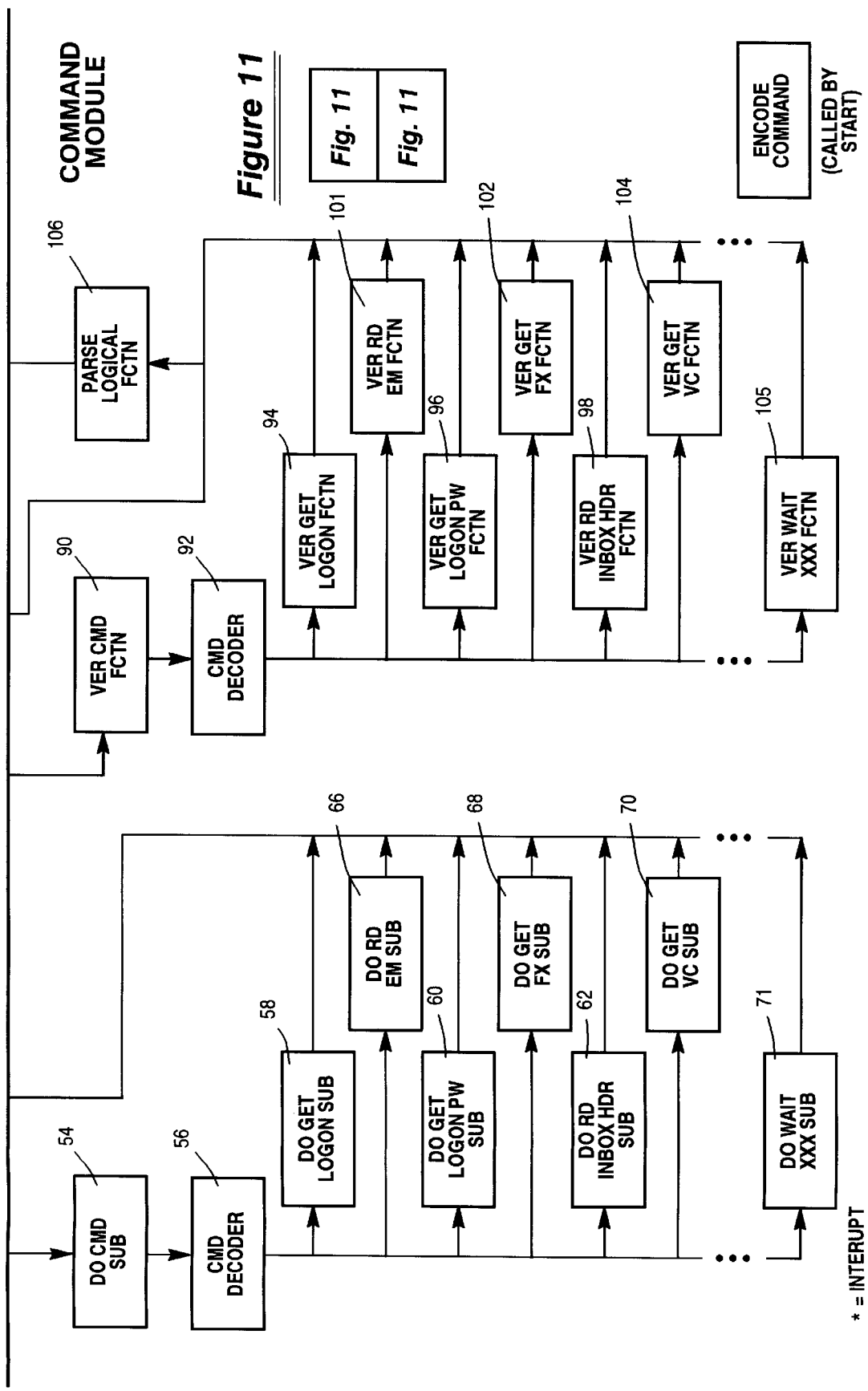

FIG. 11 is a flow diagram illustrating the operation of the test tool program. It is assumed that a test operator has already entered valid environment and scenario parameters via the Test/Setup tab 144. At step 42, the test operator presses the Start button 204 on the Start/Stop tab 146 (or the equivalent button 204' on the Info1 tab 148). Next, at step 44, a subroutine is called which allocates a number of Microsoft® Windows® sockets equal to the number of allowed concurrent sessions (i.e., the number specified by the concurrency variable), up to a maximum number of sockets, which, in the present embodiment, is 300. If a concurrency of greater than 300 is specified, sockets will be reused. In other embodiments, the maximum concurrency may be higher or lower. Each Windows® socket serves as one client connection to the application program under test. The subroutine also initializes two variables for each client connection, one variable to reflect the number of sessions completed for that client connection, and another variable to reflect the number of errors encountered on that connection.

At step 46, a new session is initialized and initiated. A new session cannot be initiated if (i) the specified concurrency has already been achieved, (ii) a new session will exceed the duration of the test run (when specified as a total number of completed sessions), or (iii) a period timer is running (the period timer controls the rate at which new sessions can be initiated, as specified by the rate parameter). The first time step 46 is performed, none of these conditions will be met, and control will pass to step 48 where a username and password (if applicable) is assigned to the new session, and one of the available client connections (a Microsoft® Windows® socket in the present embodiment) is allocated to the session. If the application program under test requires a username/password combination, the username and password specified in the user list for the assigned user are encoded using the base64 module 16 described above. Additionally, a timestamp is generated to mark the start of the session for logging purposes.

Next, at step 50, the period timer is enabled. The period timer is initialized with a value equal to the inverse of the rate parameter. The period timer controls the rate at which subsequent sessions are initiated. As represented by the dashed line 51, every time the period timer expires, a program interrupt is generated and serviced at step 86. This causes the program to reenter at step 46 in order to initiate another new session on another client connection. This is one area in which the program code of the test tool program is reentrant.

Considering the execution of one session in greater detail, after the period timer is enabled in step 50, control passes to step 52. At step 52, the program determines the next script command to be executed for this session. The commands in a test script are numbered consecutively, starting with the number "1". When the session is assigned to a client connection in step 48, a command number variable is created for the session and initialized with a value of 0. At step 52, the command number variable is incremented, thus identifying the next command to be executed. Thus, the first time step 52 is performed for a given session, the command to be executed will be command number "1"—the first command in the script.

At step 54, a DO_COMMAND subroutine of the command module is entered. Step 56 represents the main function of this subroutine, which is to decode the command name to begin executing the command instructions for that command. As mentioned above, to speed internal processing, each command name has a unique four-character code associated with it. Subroutine 56 translates the command name from the test script into its four-character internal code, and then employs the four-character code to access, and begin executing, the instructions that make-up the specified command. Blocks 58–71 represent each of the different commands of the command module, only one of which is executed each time through this portion of the program flow.

Control passes back to the core module at step 72. At step 72, if the command is an interrupt soliciting command, a 30 second timer is enabled, and control passes to step 78 where the client connection (i.e., socket) for the current session is opened and programmed to perform the network event instructed by the command (e.g., sending an HTTP request to a web application). Steps 72 and 78 are initiated by respective calls from the command being executed. For example, in the DO_LOGOFF subroutine of the LOGOFF command described above, steps 72 and 78 are initiated by lines 31–32 and line 36 of that code, respectively. After these steps are performed, the thread of execution for this session passes control to the operating system of the host computer at step 82.

If the executed command was not an interrupt soliciting command, for example, it was a WAIT command, the timer in step 72 is initialized with the value specified in the Wait command (as opposed to the 30 second timer for interrupt soliciting commands). Control then passes directly through step 78 (since no network event is to be performed) to step 82, where, as described above, the thread of execution for this session passes control to the operating system of the host computer.

At this point, as represented by dashed lines 77 and 79, the operating system is waiting on any of three interrupts, a Time-Out interrupt, an interrupt from the client connection (i.e., a socket interrupt), or an interrupt from the period timer interrupt (block 86). This is a second area in which the program code of the test tool program is reentrant. If an interrupt from the period timer occurs, control of the test tool program reenters at step 86 and passes to step 46 to initiate another new user session (assuming concurrency or duration have not been met). Execution of that new user session would then proceed as described above.

If a Time-Out interrupt occurs for an interrupt soliciting command (i.e., the 30 second timer expires), the program reenters the paused session at step 74, a time-out error is declared, and the client connection (i.e., socket) is closed. This assures that a socket interrupt will not then also be received.

If instead, an interrupt occurs on the client connection, the program reenters the paused thread at step 80, the core module checks to see if any errors were detected by the client connection, and the core module disables the timer set in step 72. This assures that a timer interrupt will not then also be received. As can be appreciated, the time-out and client connection interrupts are mutually exclusive events.

If a time-out interrupt occurs in the case where the timer was set up for a WAIT command, the program reenters the paused session at step 74, but no error is declared, and the client connection does not have to be closed since it was not opened for this command.

Next, control passes to step 76, where a Parse Script subroutine is entered. At step 84, the core module checks whether a time-out error occurred or whether any error was reported by the client connection. If no such errors occurred during the execution segment of the command, then control passes back to the command module at step 90, where the verification segment of the current command is performed (i.e., the VER_COMMAND subroutine is called). At step 92, the four character code associated with the current command is decoded to begin execution of the verification segment of the command. Blocks 94–105 represent each of the corresponding verification segments for the execution segments represented by blocks 58–71. As noted above, the WAIT command may or may not have a verification segment. Block 105 represents an example in which one is provided. Once the verification segment for the current command has executed, control passes to step 106.

If at step 84, it is determined that either a time-out error occurred or an error was reported by the client connection, an error code identifying the type of error is stored in a variable denoted "Stat1." Control then passes directly to step 106. The verification segment of the current command is not performed, since an error is already known to have occurred.

At step 106, the value of the Stat1 variable is copied to a new variable called Stat2. If step 106 was entered from step 84, Stat2 will now contain the error code reported by Stat1. If step 106 was entered after execution of the verification portion of the current command, then Stat2 will now contain either the code of an error detected by the verification segment, or will contain a value of "0," indicating that no errors were detected during verification.

Next, the command module checks whether the next subsequent commands in the test script are logical commands. As explained above, logical commands do not interact with the application program under test, and do not perform interrupt soliciting events. If logical commands are present, they are executed. If an error occurs during execution of a logical command, an error code identifying the error is written to Stat2, overwriting any previous error codes. Once any subsequent, consecutive logical commands have been executed, or if there were no logical commands to execute, control passes back to the core module at step 108.

At step 108, the core module determines from the Stat2 variable whether any errors have been logged. If an error is present, then at step 110 a flag (named "This One Done") is set to indicate the presence of the error. If no error is indicated, control passes to step 112 and the flag is not set.

At step 112, the core module determines whether all commands in the test script have been executed for the current session. If so, the "This One Done" flag is set at step 114, and control then passes to step 116. If there are more commands to be executed, control instead passes directly to step 116. Step 116 tests whether the test operator has clicked on the Pause button 206 of Start/Stop tab 146 (or the equivalent button 206' of the Info1 tab 148). If so, the core module waits at step 118 until the test operator again presses the Start button 204 (or 204'). If no pause was detected at step 116, or there was a pause but the operator has again pressed the Start button, then control passes through step 120 to step 122.

At step 122, if the Event Log option was selected for this test run, the core module writes information concerning the execution of the last command to the log file. Next, the core module tests the This One Done flag. If the flag is not set, control passes back to step 52, so that the next command in the test script can be executed for the current session in the manner described above. If, however, the This One Done flag is set, the core module considers the current session to have been completed, and control passes to step 124.

At step 124, if the Session Log option has been selected, the core module writes information concerning the session to the log file. Additionally, the variable indicating the total number of sessions completed is incremented, and if an error had occurred during the session, the variable indicating the total number of errors is also incremented. Control then passes to step 126.

At step 126, the core module determines whether the current test run is done. Specifically, the core module checks to see if the duration parameter (either a total number of completed sessions, or a specified stop time) has been met. If so, the test tool program execution terminates at step 127. If the duration parameter has not yet been met, control passes to step 128. At step 128, the core module determines whether the period timer is running. If so, the core module cannot yet initiate a new session, so control reverts to the operating system to wait on one of the three interrupts described above. If, however, the period timer is not running, indicating that it is permissible to start a new session, control passes to step 46 where a new user session is initialized and initiated.

As the foregoing illustrates, the present invention is directed to a test tool for testing application programs of the type that are deployed on a server computer and that are intended to be accessed concurrently by multiple users over a network, such as the Internet or an intranet. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A computer-readable medium having program code stored thereon for simulating, from a single computer executing said program code, the interactions of real users with an application program of the type that is deployed on a server computer for access by said users over a network, said program code comprising:

a command module containing a plurality of commands specific to an application program under test, each command comprising instructions for causing said single computer to simulate interaction by a real user with a different user function of said application program under test, each command having a unique name assigned thereto, the command module being rewritable and customizable for simulating user interactions with the user functions of different application programs; and a core module independent of the command module and comprising instructions for causing said single computer to execute concurrently, on each of a plurality of different client connections to the application program under test, a series of command module commands specified by name in a test script, whereby concurrent, multi-user interaction with said application program under test is simulated.

2. The computer-readable medium recited in claim 1, wherein the core module further comprises instructions for causing said single computer to initiate the execution of said test script on successive client connections at a predetermined rate, until the test script is executing concurrently on a pre-defined number of client connections.

3. The computer-readable medium recited in claim 1, wherein the instructions of the core module cause the single computer to continue to execute the test script repeatedly on each of the client connections until either the test script has been executed a pre-defined total number of times or a pre-defined time period for testing the application program has elapsed.

4. The computer-recited medium recited in claim 1, wherein each command of the command module comprises an execution segment containing instructions for performing a user function of the application program under test, and a verification segment containing instructions for verifying at said single computer that the user function was performed correctly by the application program.

5. The computer-readable medium recited in claim 4, wherein the verification segment parses a user interface object associated with the user function to test whether expected elements of the user interface object appear in response to execution of the user function.

6. The computer-readable medium recited in claim 1, wherein said application programs comprise web applications, and wherein said network comprises the Internet.

7. The computer-readable medium recited in claim 1, wherein said network comprises one of the Internet and an intranet.

8. The computer-readable medium recited in claim 1, wherein each execution of the test script on one of the client connections comprises a different thread of execution.

9. The computer-readable medium recited in claim 8, wherein the instructions comprising the computer program support reentrant, multi-tasked execution of the different threads.

10. The computer-readable medium recited in claim 8, wherein the different threads of execution are semi-randomly staggered to mimic a random distribution of client interactions with the application program under test.

11. The computer-readable medium recited in claim 1, wherein said command module further contains a WAIT command, the instructions of which cause said single computer to simulate a time period of a pre-determined length during which no interaction with the user functions of the application program is performed.

12. The computer-readable medium recited in claim 11, wherein said WAIT command is generic to all of said application programs.

13. The computer-readable medium recited in claim 1, wherein the test script comprises any desired combination of command names in any desired order.

14. A method for simulating, from a single computer, the interactions of real users with an application program of the type that is deployed on a server computer for access by said users over a network, said method comprising the steps of:

generating a command module containing a plurality of commands specific to an application program under test, each command comprising instructions for causing said single computer to simulate interaction by a real user with a different user function of said application program under test, each command having a unique name assigned thereto, the command module being rewritable and customizable for simulating user interactions with the user functions of different application programs; and executing concurrently from said single computer, on each of a plurality of different client connections to the application program under test, a series of command module commands specified by name in a test script, whereby concurrent, multi-user interaction with said application program under test is simulated.

15. The method recited in claim 14, further comprising the step of initiating the execution of said test script on successive client connections at a predetermined rate, until the test script is executing concurrently on a pre-defined number of client connections.

16. The method recited in claim 14, wherein said executing step comprises executing the test script repeatedly on each of the client connections until either the test script has been executed a pre-defined total number of times or a pre-defined time period for testing the application program has elapsed.

17. The method recited in claim 14, wherein each command of the command module comprises an execution segment containing instructions for performing a user function of the application program under test, and a verification segment containing instructions for verifying at said single computer that the user function was performed correctly by the application program.

18. The method recited in claim 17, wherein the verification segment parses a user interface object associated with the user function to test whether expected elements of the user interface object appear in response to execution of the user function.

19. The method recited in claim 14, wherein said application programs comprise web applications, and wherein said network comprises the Internet.

20. The method recited in claim 14, wherein said network comprises one of the Internet and an intranet.

21. The method recited in claim 14, wherein each execution of the test script on one of the client connections comprises a different thread of execution within said single computer.

22. The method recited in claim 21, wherein the different threads are executed from said single computer in a reentrant, multi-tasked manner.

23. The method recited in claim 21, wherein the different threads of execution are semi-randomly staggered to mimic a random distribution of client interactions with the application program under test.

24. The method recited in claim 14, wherein said command module further contains a WAIT command, the instructions of which cause said single computer to simulate a time period of a pre-determined length during which no interaction with the user functions of the application program is performed.

25. The method recited in claim 24, wherein said WAIT command is generic to all of said application programs.

26. The method recited in claim 14, wherein the test script comprises any desired combination of command names in any desired order.

27. A computer-readable medium having program code stored thereon for simulating, from a single computer executing said program code, the interactions of real users with an application program of the type that is deployed on a server computer for access by said users over a network, said program code comprising:

a command module containing a plurality of commands specific to an application program under test, each command comprising an execution segment containing instructions for causing said single computer to simulate interaction by a real user with a respective user function of said application program under test, and a verification segment containing instructions for causing said single computer to simulate verification by said real user that the user function was performed correctly by the application program, each command having a unique name assigned thereto, the command module being rewritable and customizable for simulating user interactions with the user functions of different application programs; and a core module independent of the command module and comprising instructions for causing said single computer to execute concurrently, on each of a plurality of different client connections to the application program under test, a series of command module commands specified by name in a test script, whereby concurrent, multi-user interaction with said application program under test is simulated.

28. The computer-readable medium recited in claim 27, wherein the core module further comprises instructions for causing said single computer to initiate the execution of said test script on successive client connections at a predetermined rate, until the test script is executing concurrently on a pre-defined number of client connections.

29. The computer-readable medium recited in claim 27, wherein the instructions of the core module cause the single computer to continue to execute the test script repeatedly on each of the client connections until either the test script has been executed a pre-defined total number of times or a pre-defined time period for testing the application program has elapsed.

30. The computer-readable medium recited in claim 27, wherein the instructions of the verification segment of each command of the command module parse a user interface object associated with the user function performed by that command to test whether expected elements of the user interface object appear in response to execution of the user function.

31. The computer-readable medium recited in claim 27 wherein said application programs comprise web applications, and wherein said network comprises the Internet.

32. The computer-readable medium recited in claim 27, wherein said network comprises one of the Internet and an intranet.

33. The computer-readable medium recited in claim 27, wherein each execution of the test script on one of the client connections comprises a different thread of execution.

34. The computer-readable medium recited in claim 33 wherein the instructions comprising the computer program support reentrant, multi-tasked execution of the different threads.

35. The computer-readable medium recited in claim 27 wherein said command module further contains a WAIT command, the instructions of which cause said single computer to simulate a time period of a pre-determined length during which no interaction with the user functions of the application program is performed.

36. The computer-readable medium recited in claim 35 wherein said WAIT command is generic to all of said application programs.

37. The computer-readable medium recited in claim 27, wherein the test script comprises any desired combination of command names in any desired order.

38. The computer-readable medium recited in claim 33, wherein the different threads of execution are semi-randomly staggered to mimic a random distribution of client interactions with the application program under test.

* * * * *